United States Patent
Keller et al.

(10) Patent No.: US 6,636,959 B1
(45) Date of Patent: Oct. 21, 2003

(54) PREDICTOR MISS DECODER UPDATING LINE PREDICTOR STORING INSTRUCTION FETCH ADDRESS AND ALIGNMENT INFORMATION UPON INSTRUCTION DECODE TERMINATION CONDITION

(75) Inventors: James B. Keller, Palo Alto, CA (US); Puneet Sharma, Singapore (SG); Keith R. Schakel, San Jose, CA (US); Francis M. Matus, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/416,275

(22) Filed: Oct. 14, 1999

(51) Int. Cl.⁷ ................................................ G06F 9/38
(52) U.S. Cl. ..................... 712/204; 712/206; 712/210
(58) Field of Search ............................... 712/204, 210, 712/206

(56) References Cited

U.S. PATENT DOCUMENTS

| | | | |
|---|---|---|---|
| 4,437,149 A | 3/1984 | Pomerene et al. ........... 712/213 |
| 4,860,197 A | 8/1989 | Langendorf et al. ........ 712/238 |
| 5,101,341 A | 3/1992 | Circello et al. ............. 712/213 |
| 5,337,415 A | 8/1994 | DeLano et al. ............. 712/213 |
| 5,353,419 A | 10/1994 | Touch et al. ................ 712/235 |
| 5,434,985 A | 7/1995 | Emma et al. ................ 712/240 |
| 5,442,760 A | 8/1995 | Rustad et al. ............... 712/215 |
| 5,488,710 A | 1/1996 | Sato et al. ................... 711/125 |
| 5,506,976 A | 4/1996 | Jaggar ......................... 712/238 |
| 5,513,330 A | 4/1996 | Stiles .......................... 712/204 |
| 5,535,347 A | 7/1996 | Grochowski et al. ....... 712/204 |
| 5,584,001 A | 12/1996 | Hoyt et al. .................. 712/238 |
| 5,586,276 A | 12/1996 | Grochowski et al. ....... 712/204 |
| 5,625,787 A | 4/1997 | Mahin et al. ................ 712/204 |
| 5,630,082 A | 5/1997 | Yao et al. .................... 712/213 |
| 5,669,011 A | 9/1997 | Alpert et al. ................ 712/213 |
| 5,758,114 A | 5/1998 | Johnson et al. ............. 712/204 |
| 5,790,821 A | 8/1998 | Pflum .......................... 712/200 |
| 5,809,273 A | 9/1998 | Favor et al. ................. 712/210 |
| 5,819,059 A | 10/1998 | Tran ............................ 712/213 |
| 5,822,558 A | 10/1998 | Tran ............................ 712/213 |
| 5,822,559 A | 10/1998 | Narayan et al. ............. 712/214 |
| 5,822,560 A | 10/1998 | Pflum .......................... 712/214 |
| 5,828,874 A | 10/1998 | Steely, Jr. .................... 712/240 |
| 5,859,992 A * | 1/1999 | Tran et al. ................... 712/204 |
| 5,872,943 A | 2/1999 | Pickett et al. ............... 712/204 |
| 5,987,235 A | 11/1999 | Tran ............................ 712/210 |
| 6,012,125 A | 1/2000 | Tran ............................ 711/125 |
| 6,122,656 A | 9/2000 | Witt ............................. 709/100 |
| 6,122,727 A | 9/2000 | Witt ............................. 712/214 |
| 6,125,441 A * | 9/2000 | Green .......................... 712/204 |
| 6,205,546 B1 | 3/2001 | Natan et al. ................. 712/238 |
| 6,256,729 B1 | 7/2001 | Cherabuddi et al. ........ 712/238 |
| 6,263,427 B1 | 7/2001 | Cummins et al. ........... 712/236 |
| 6,279,105 B1 | 8/2001 | Konigsburg et al. ........ 712/238 |
| 6,304,961 B1 | 10/2001 | Yung et al. .................. 712/238 |
| 6,332,191 B1 | 12/2001 | Witt ............................. 712/240 |
| 6,546,478 B1 | 4/2003 | Keller et al. ................. 712/204 |

FOREIGN PATENT DOCUMENTS

| | | |
|---|---|---|
| EP | 0 690 373 | 1/1996 |
| WO | 93/17385 | 9/1993 |

* cited by examiner

Primary Examiner—Kenneth S. Kim
(74) Attorney, Agent, or Firm—Lawrence J. Merkel; Meyertons, Hood, Kivlin, Kowert & Goetzel, P.C.

(57) ABSTRACT

A line predictor caches alignment information for instructions. In response to each fetch address, the line predictor provides information for the instruction beginning at the fetch address, as well as alignment information for up to one or more additional instructions subsequent to that instruction. The line predictor may include a memory having multiple entries, each entry storing up to a predefined maximum number of instruction pointers and a fetch address corresponding to the instruction identified by a first one of the instruction pointers. Since the line predictor provides alignment information from one entry per fetch, the line predictor may provide a flow control mechanism for the initial portion of the pipeline within a microprocessor. Each entry may store combinations of instructions which the hardware within the pipeline may handle without creating stalls resulting from the combinations.

30 Claims, 15 Drawing Sheets

FIG. 1

| Line Termination Conditions |
|---|
| Microcode Instruction |
| Branch Instruction |
| Maximum # of Instructions |
| Maximum # of Instruction Bytes |
| Maximum # of ROPs |
| Page Crossing |
| Maximum Number of Destination Registers (Maximum Number of Renames) |

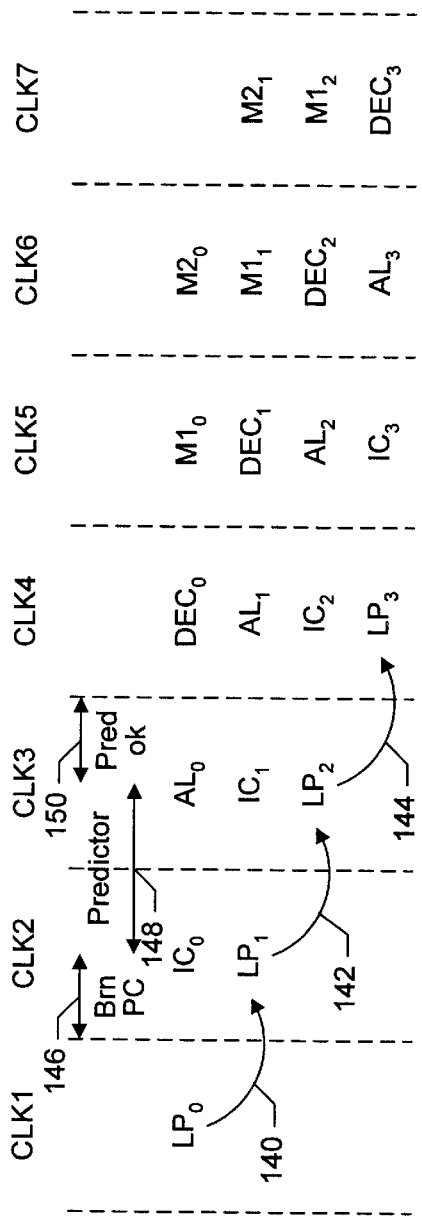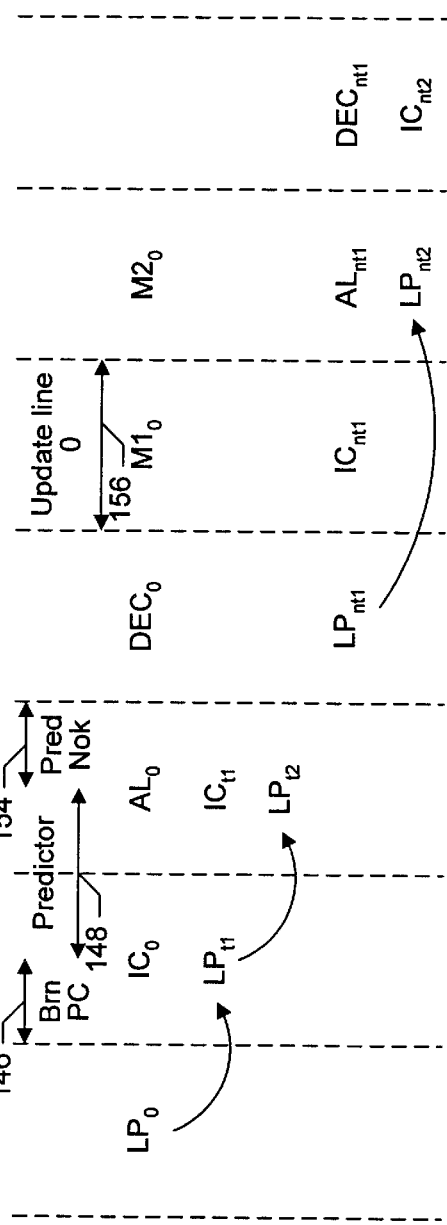

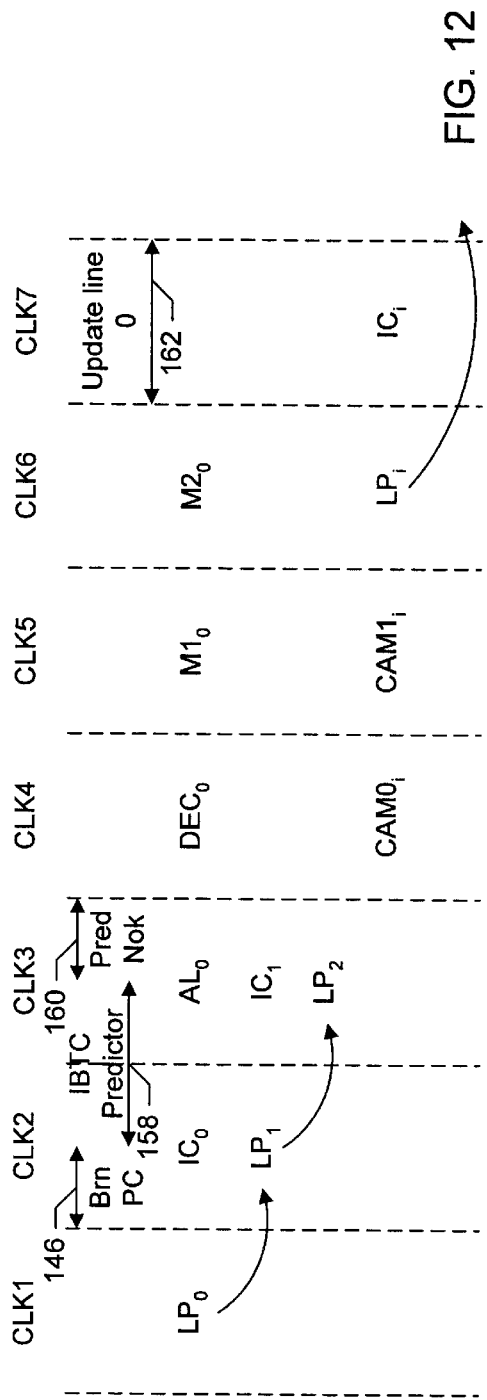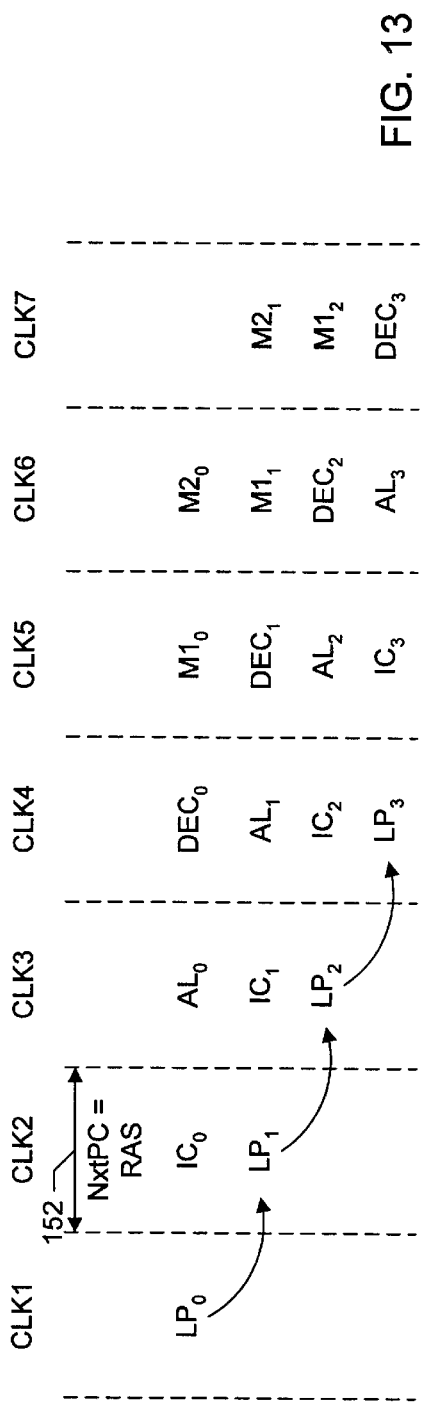

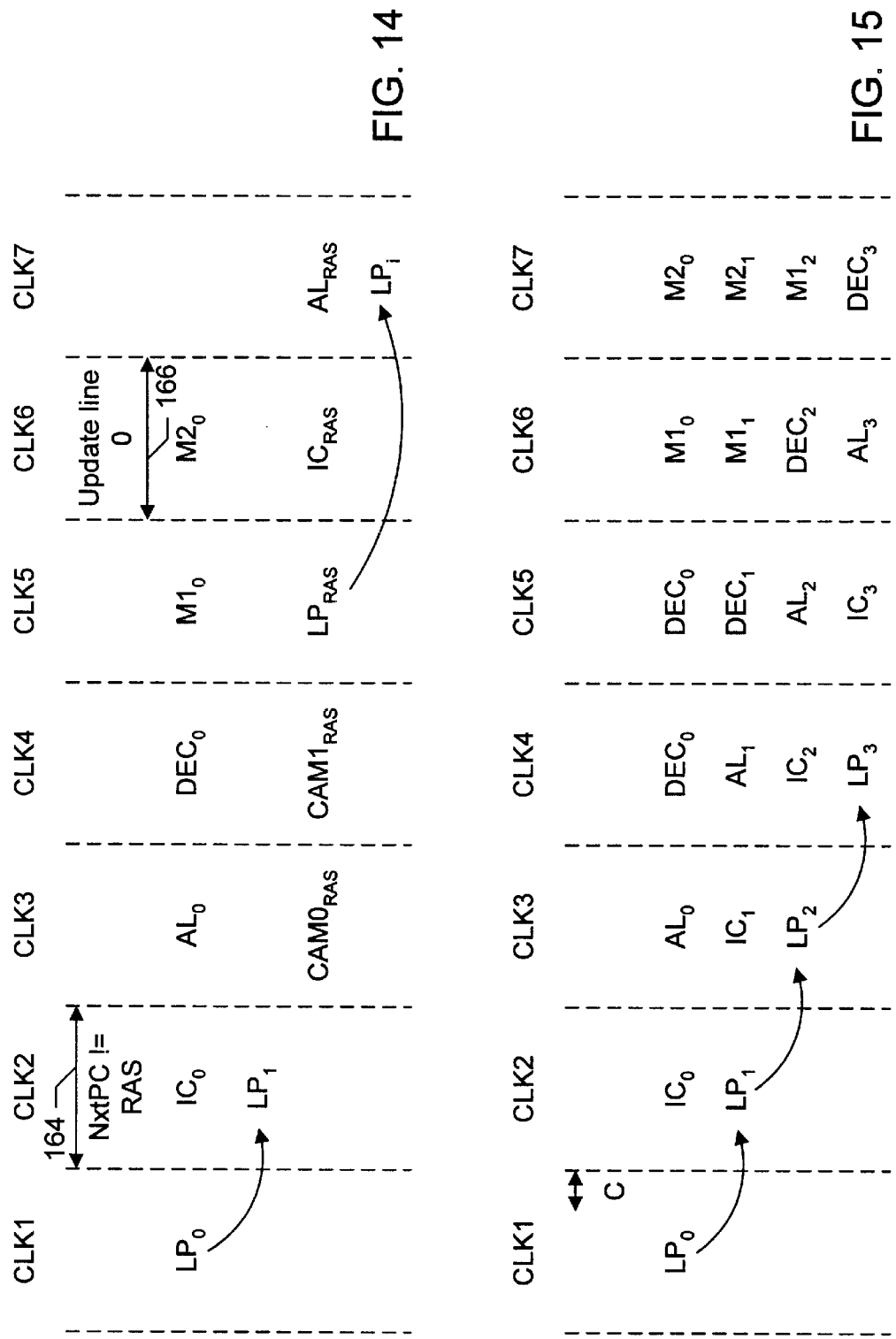

PREDICTOR MISS DECODER UPDATING LINE PREDICTOR STORING INSTRUCTION FETCH ADDRESS AND ALIGNMENT INFORMATION UPON INSTRUCTION DECODE TERMINATION CONDITION

BACKGROUND OF THE INVENTION

1. Field of the Invention

This invention is related to the field of processors and, more particularly, to instruction fetching mechanisms within processors.

2. Description of the Related Art

Superscalar processors achieve high performance by executing multiple instructions per clock cycle and by choosing the shortest possible clock cycle consistent with the design. As used herein, the term "clock cycle" refers to an interval of time accorded to various stages of an instruction processing pipeline within the processor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

A popular instruction set architecture is the x86 instruction set architecture. Due to the widespread acceptance of the x86 instruction set architecture in the computer industry, superscalar processors designed in accordance with this architecture are becoming increasingly common. The x86 instruction set architecture specifies a variable byte-length instruction set in which different instructions may occupy differing numbers of bytes. For example, the 80386 and 80486 processors allow a particular instruction to occupy a number of bytes between 1 and 15. The number of bytes occupied depends upon the particular instruction as well as various addressing mode options for the instruction.

Because instructions are variable-length, locating instruction boundaries is complicated. The length of a first instruction must be determined prior to locating a second instruction subsequent to the first instruction within an instruction stream. However, the ability to locate multiple instructions within an instruction stream during a particular clock cycle is crucial to superscalar processor operation. As operating frequencies increase (i.e. as clock cycles shorten), it becomes increasingly difficult to locate multiple instructions simultaneously.

Various predecode schemes have been proposed in which a predecoder appends information regarding each instruction byte to the instruction byte as the instruction is stored into the cache. As used herein, the term "predecoding" is used to refer to generating instruction decode information prior to storing the corresponding instruction bytes into an instruction cache of a processor. The generated information may be stored with the instruction bytes in the instruction cache. For example, an instruction byte may be indicated to be the beginning or end of an instruction. By scanning the predecode information when the corresponding instruction bytes are fetched, instructions may be located without actually attempting to decode the instruction bytes. The predecode information may be used to decrease the amount of logic needed to locate multiple variable-length instructions simultaneously. Unfortunately, these schemes become insufficient at high clock frequencies as well. A method for locating multiple instructions during a clock cycle at high frequencies is needed.

SUMMARY OF THE INVENTION

The problems outlined above are in large part solved by a line predictor as described herein. The line predictor caches alignment information for instructions. In response to each fetch address, the line predictor provides information for the instruction beginning at the fetch address, as well as alignment information for up to one or more additional instructions subsequent to that instruction. The alignment information may be, for example, instruction pointers, each of which directly locates a corresponding instruction within a plurality of instruction bytes fetched in response to the fetch address. The line predictor may include a memory having multiple entries, each entry storing up to a predefined maximum number of instruction pointers and a fetch address corresponding to the instruction identified by a first one of the instruction pointers. Fetch addresses may be searched against the fetch addresses stored in the multiple entries, and if a match is detected the corresponding instruction pointers may be used. Additionally, each entry may include a link to another entry storing instruction pointers to the next instructions within the predicted instruction stream and a next fetch address corresponding to the first instruction within the next entry. The link to the next entry may be provided to the line predictor to fetch the next entry during the next clock cycle, and the next fetch address may be provided to the instruction cache to fetch the corresponding instruction bytes.

Since the line predictor provides alignment information from one entry per fetch, the line predictor may provide a flow control mechanism for the initial portion of the pipeline within a microprocessor. Each entry may store combinations of instructions which the hardware within the pipeline may handle without creating stalls resulting from the combinations. Furthermore, by specifying the allowable combinations within an entry, the pipeline hardware may be simplified. Rather than handling the more complicated combinations with the pipeline hardware (either by stalling some of the instructions while processing others, or providing hardware to concurrently process the more complicated combinations), complicated combinations may be divided into multiple entries linked in the manner described above. A portion of the combination is fetched during a first clock cycle, and the remainder of the combination is fetched during the next clock cycle.

Since instructions located by a particular entry may be handled by the pipeline hardware, the instructions may flow through various pipeline stages as a unit. When the instructions reach the portion of the pipeline at which instructions are scheduled for execution, then they may be treated individually. Additional pipeline hardware simplifications may be realized. Because the pipeline hardware is simplified, higher frequency operation may be achieved than more complicated pipeline hardware which handles concurrent fetch of the more complicated combinations of instructions.

Broadly speaking, a processor is contemplated, comprising a fetch address generation unit configured to generate a fetch address and a line predictor coupled to the fetch address generation unit. The line predictor includes a first memory comprising a plurality of entries, each entry storing a plurality of instruction pointers. The line predictor is configured to detect a miss of the fetch address in the line predictor. Coupled to receive a plurality of instruction bytes fetched in response to the fetch address and further coupled to the line predictor, the decode unit is configured to decode the plurality of instruction bytes in response to the miss to generate the plurality of instruction pointers for a first entry in the first memory. The first entry corresponds to the fetch address. The decode unit is configured to terminate decode and provide the plurality of instruction pointers to the line predictor in response to detecting a termination condition. Additionally, a computer system is contemplated including the processor and an input/output (I/O) device configured to communicate between the computer system and another computer system to which the I/O device is couplable.

Moreover, a method is contemplated. A fetch address is generated. A miss of the fetch address is detected in a line predictor which includes a first memory comprising a plurality of entries, each entry storing a plurality of instruction pointers. Responsive to the miss, a plurality of instruction bytes fetched in response to the fetch address are decoded to generate the plurality of instruction pointers for a first entry in the first memory. The first entry corresponds to the fetch address. A termination condition is detected during the decode, and the decode is terminated and the plurality of instruction pointers are provided to the line predictor in response to detecting a termination condition.

BRIEF DESCRIPTION OF THE DRAWINGS

Other objects and advantages of the invention will become apparent upon reading the following detailed description and upon reference to the accompanying drawings in which:

FIG. 9 is a table illustrating one embodiment of termination conditions for creating an entry within the line predictor.

FIG. 10 is a timing diagram illustrating operation of one embodiment of the line predictor for a branch prediction which matches the prediction made by the line predictor.

FIG. 11 is a timing diagram illustrating operation of one embodiment of the line predictor for a branch prediction which does not match the prediction made by the line predictor.

FIG. 12 is a timing diagram illustrating operation of one embodiment of the line predictor for an indirect target branch prediction which does not match the prediction made by the line predictor.

FIG. 13 is a timing diagram illustrating operation of one embodiment of the line predictor for a return address prediction which matches the prediction made by the line predictor.

FIG. 14 is a timing diagram illustrating operation of one embodiment of the line predictor for a return address prediction which does not match the prediction made by the line predictor.

FIG. 15 is a timing diagram illustrating operation of one embodiment of the line predictor for a fetch which crosses a page boundary.

Figure 1:
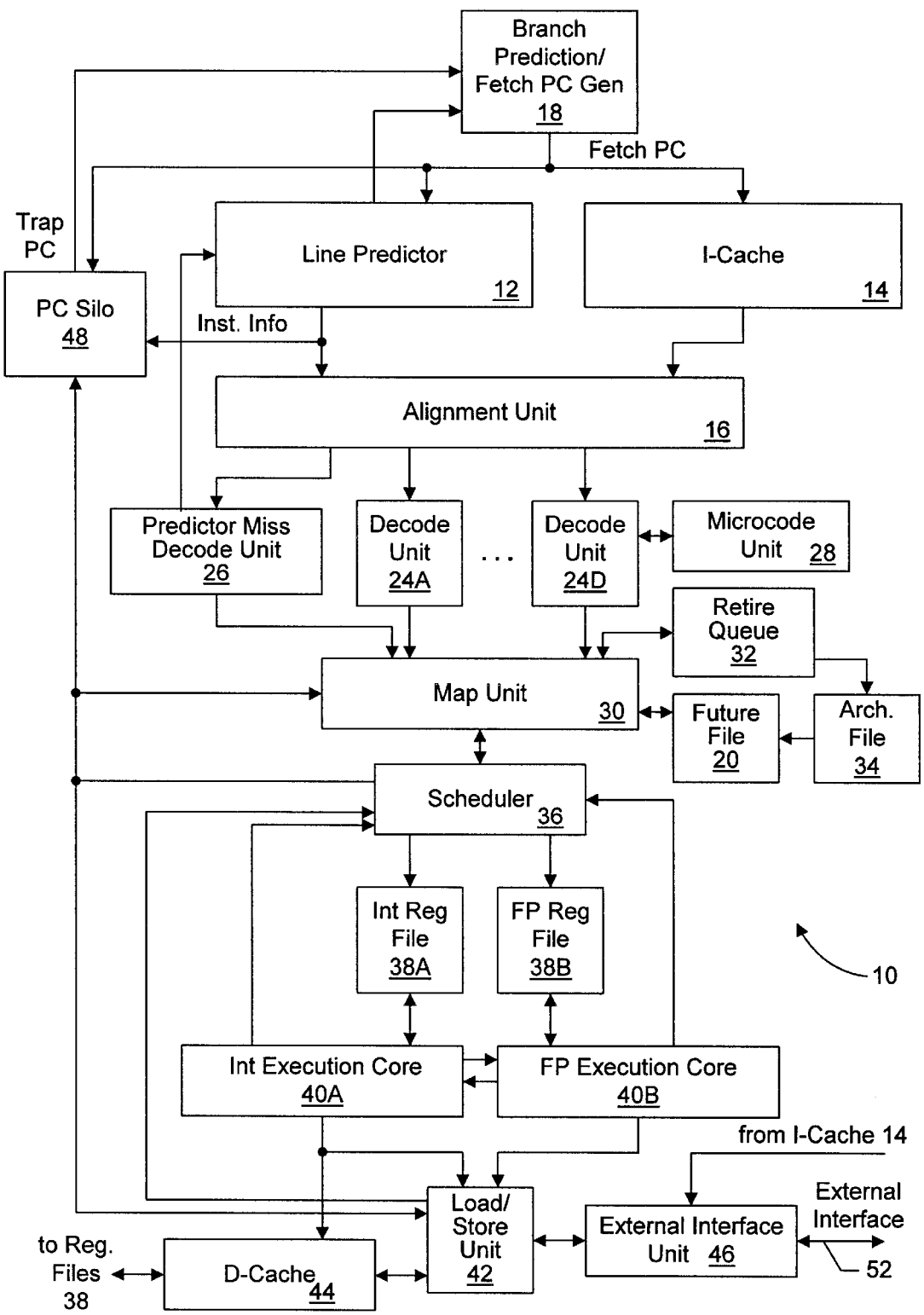
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to each other and respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24D decode the instructions provided thereto, and each decode unit 24A–24D generates information identifying one or more instruction operations (or ROPS) corresponding to the instructions. In one embodiment, each decode unit 24A–24B may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, embodiments employing non-CISC instruction sets may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, PC silo 48 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded.

Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidate in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by PC silo 48. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBs). Execution core 40B may include a floating point/multimedia multiplier, a floating point/multimedia adder, and a store data unit for delivering store data to load/store unit 42. Other configurations of execution units are possible.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable exterial interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
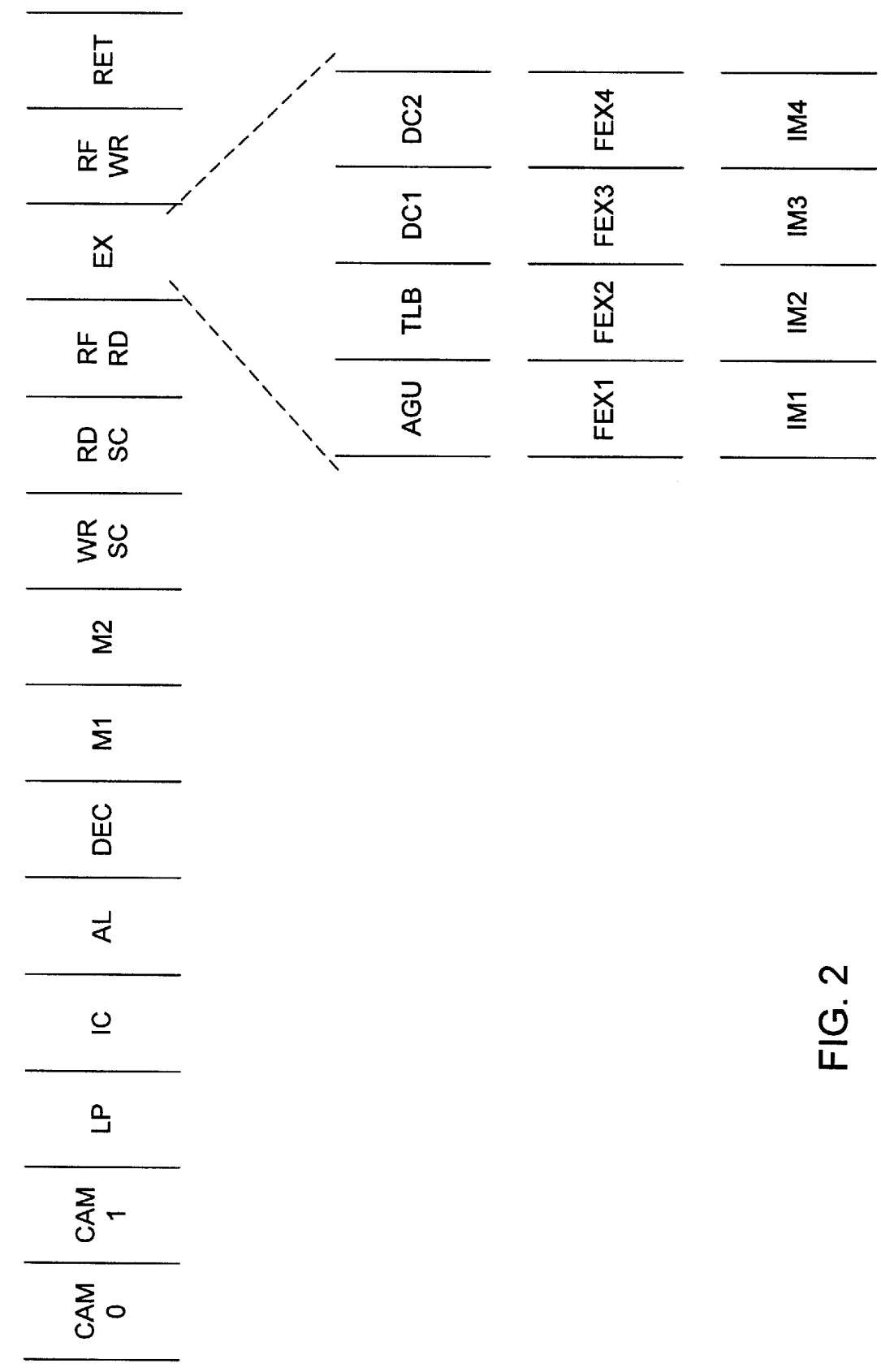
FIG. 2 is a pipeline diagram which may be employed by one embodiment of the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical dashed lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages (e.g. in ITLB 60 shown in FIG. 3). In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Line Predictor

Figure 3:
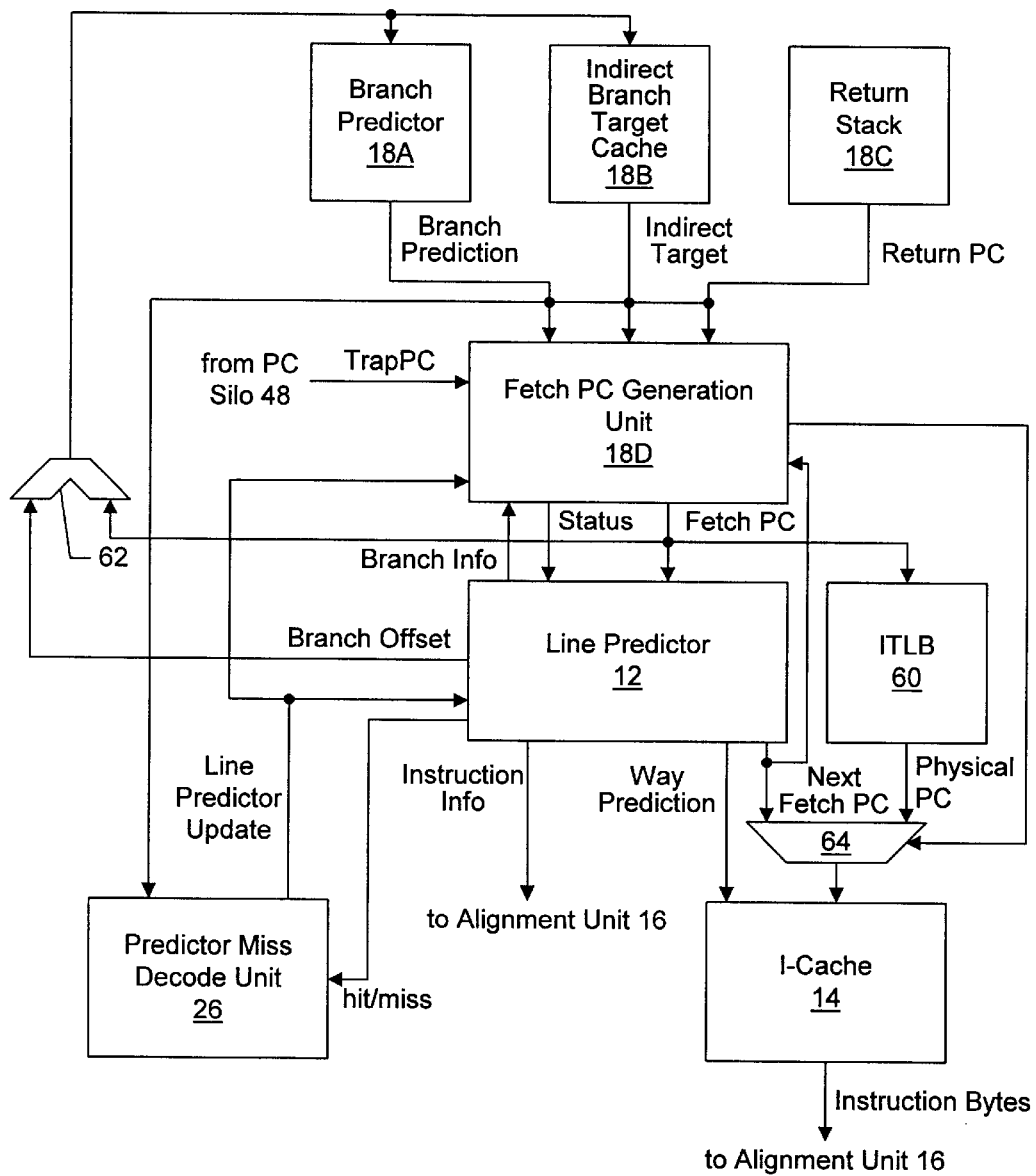
FIG. 3 is a block diagram illustrating one embodiment of a branch prediction apparatus, a fetch PC generation unit, a line predictor, an instruction TLB, an I-cache, and a predictor miss decode unit.

Turning now to FIG. 3, a block diagram illustrating one embodiment of branch prediction/fetch PC generation unit 18, line predictor 12, I-cache 14, predictor miss decode unit 26, an instruction TLB (ITLB) 60, an adder 62, and a fetch address mux 64 is shown. Other embodiments are possible and contemplated. In the embodiment of FIG. 3, branch prediction/fetch PC generation unit 18 includes a branch predictor 18A, an indirect branch target cache 18B, a return stack 18C, and fetch PC generation unit 18D. Branch predictor 18A and indirect branch target cache 18B are coupled to receive the output of adder 62, and are coupled to fetch PC generation unit 18D, line predictor 12, and predictor miss decode unit 26. Fetch PC generation unit 18D is coupled to receive a trap PC from PC silo 48, and is further coupled to ITLB 60, line predictor 12, adder 62, and fetch address mux 64. ITLB 60 is further coupled to fetch address mux 64, which is coupled to I-cache 14. Line predictor 12 is coupled to I-cache 14, predictor miss decode unit 26, adder 62, and fetch address mux 64.

Generally, fetch PC generation unit 18D generates a fetch address (fetch PC) for instructions to be fetched. The fetch address is provided to line predictor 12, TLB 60, and adder 62 (as well as PC silo 48, as shown in FIG. 1). Line predictor 12 compares the fetch address to fetch addresses stored therein to determine if a line predictor entry corresponding to the fetch address exists within line predictor 12. If a corresponding line predictor entry is found, the instruction pointers stored in the line predictor entry are provided to alignment unit 16. In parallel with line predictor 12 searching the line predictor entries, ITLB 60 translates the fetch address (which is a virtual address in the present embodiment) to a physical address (physical PC) for access to I-cache 14. ITLB 60 provides the physical address to fetch address mux 64, and fetch PC generation unit 18D controls mux 64 to select the physical address. I-cache 14 reads instruction bytes corresponding to the physical address and provides the instruction bytes to alignment unit 16.

In the present embodiment, each line predictor entry also provides a next fetch address (next fetch PC). The next fetch address is provided to mux 64, and fetch PC generation unit 18D selects the address through mux 64 to access I-cache 14 in response to line predictor 12 detecting a hit. In this manner, the next fetch address may be more rapidly provided to I-cache 14 as long as the fetch addresses continue to hit in the line predictor. The line predictor entry may also include an indication of the next line predictor entry within line predictor 12 (corresponding to the next fetch address) to allow line predictor 12 to fetch instruction pointers corresponding to the next fetch address. Accordingly, as long as fetch addresses continue to hit in line predictor 12, fetching of lines of instructions may be initiated from the line predictor stage of the pipeline shown in FIG. 2. Traps initiated by PC silo 48 (in response to scheduler 36), a disagreement between the prediction made by line predictor 12 for the next fetch address and the next fetch address generated by fetch PC generation unit 18D (described below) and page crossings (described below) may cause line predictor 12 to search for the fetch address provided by fetch PC generation unit 18D, and may also cause fetch PC generation unit 18D to select the corresponding physical address provided by ITLB 60.

Even while next fetch addresses are being generated by line predictor 12 and are hitting in line predictor 12, fetch PC generation unit 18D continues to generate fetch addresses for logging by PC silo 48. Furthermore, fetch PC generation unit 18D may verify the next fetch addresses provided by line predictor 12 via the branch predictors 18A–18C. The line predictor entries within line predictor 12 identify the terminating instruction within the line of instructions by type, and line predictor 12 transmits the type information to fetch PC generation unit 18D as well as the predicted direction of the terminating instruction (branch info in FIG. 3). Furthermore, for branches forming a target address via a branch displacement included within the branch instruction, line predictor 12 may provide an indication of the branch displacement. For purposes of verifying the predicted next fetch address, the terminating instruction may be a conditional branch instruction, an indirect branch instruction, or a return instruction.

If the terminating instruction is a conditional branch instruction or an indirect branch instruction, line predictor 12 generates a branch offset from the current fetch address to the branch instruction by examining the instruction pointers in the line predictor entry. The branch offset is added to the current fetch address by adder 62, and the address is provided to branch predictor 18A and indirect branch target cache 18B. Branch predictor 18A is used for conditional branches, and indirect branch target cache 18B is used for indirect branches.

Generally, branch predictor 18A is a mechanism for predicting conditional branches based on the past behavior of conditional branches. More particularly, the address of the branch instruction is used to index into a table of branch predictions (e.g., two bit saturating counters which are incremented for taken branches and decremented for not-taken branches, and the most significant bit is used as a taken/not-taken prediction). The table is updated based on past executions of conditional branch instructions, as those branch instructions are retired or become non-speculative. In one particular embodiment, two tables are used (each having 16K entries of two bit saturating counters). The tables are indexed by an exclusive OR of recent branch prediction history and the least significant bits of the branch address, and each table provides a prediction. A third table (comprising 4K entries of two bit saturating selector counters) stores a selector between the two tables, and is indexed by the branch address directly. The selector picks one of the predictions provided by the two tables as the prediction for the conditional branch instruction. Other embodiments may employ different configurations and different numbers of entries. Using the three table structure, aliasing of branches having the same branch history and least significant address bits (but different most significant address bits) may be alleviated.

In response to the address provided by adder 62, branch predictor 18A provides a branch prediction. Fetch PC generation unit 18D compares the prediction to the prediction recorded in the line predictor entry. If the predictions do not match, fetch PC generation unit 18D signals (via status lines shown in FIG. 3) line predictor 12. Additionally, fetch PC generation unit 18D generates a fetch address based on the prediction from branch predictor 18A (either the branch target address generated in response to the branch displacement, or the sequential address). More particularly, the branch target address in the x86 instruction set architecture may be generated by adding the sequential address and the branch displacement. Other instruction set architectures may add the address of the branch instruction to the branch displacement.

In one embodiment, line predictor 12 stores a next alternate fetch address (and alternate indication of the next line predictor entry) in each line predictor entry. If fetch PC generation unit 18D signals a mismatch between the prediction recorded in a particular line predictor entry and the prediction from branch predictor 18A, line predictor 12 may swap the next fetch address and next alternate fetch address. In this manner, the line predictor entry may be updated to reflect the actual execution of branch instructions (recorded in branch predictor 18A). The line predictor is thereby trained to match recent branch behavior, without requiring that the line predictor entries be directly updated in response to branch instruction execution.

Indirect branch target cache 18B is used for indirect branch instructions. While branch instructions which form a target address from the branch displacement have static branch target addresses (at least at the virtual stage, although page mappings to physical addresses may be changed), indirect branch instructions have variable target addresses based on register and/or memory operands. Indirect branch target cache 18B caches previously generated indirect branch target addresses in a table indexed by branch instruction address. Similar to branch predictor 18A, indirect branch target cache 18B is updated with actually generated indirect branch target addresses upon the retirement of indirect branch target instructions. In one particular embodiment, indirect branch target cache 18B may comprise a branch target buffer having 128 entries, indexed by the least significant bits of the indirect branch instruction address, a second table having 512 entries indexed by the exclusive-OR of the least significant bits of the indirect branch instruction address (bits inverted) and least significant bits of the four indirect branch target addresses most recently predicted using the second table. The branch target buffer output is used until it mispredicts, then the second table is used until it mispredicts, etc. This structure may predict indirect branch target addresses which do not change during execution using the branch target buffer, while using the second table to predict addresses which do change during execution.

Fetch PC generation unit 18D receives the predicted indirect branch target address from indirect branch target cache 18B, and compares the indirect branch target address to the next fetch address generated by line predictor 12. If the addresses do not match (and the corresponding line predictor entry is terminated by an indirect branch instruction), fetch PC generation unit 18D signals line predictor 12 (via the status lines) that a mismatched indirect branch target has been detected. Additionally, the predicted indirect target address from indirect branch target cache 18B is generated as the fetch address by fetch PC generation unit 18D. Line predictor 12 compares the fetch address to detect a hit and select a line predictor entry. I-cache 14 (through ITLB 60) fetches the instruction bytes corresponding to the fetch address. It is noted that, in one embodiment, indirect branch target cache 18B stores linear addresses and the next fetch address generated by line predictor 12 is a physical address. However, indirect branch instructions may be unconditional in such an embodiment, and the next alternate fetch address field (which is not needed to store an alternate fetch address since the branch is unconditional) may be used to store the linear address corresponding to the next fetch address for comparison purposes.

Return stack 18C is used to predict target addresses for return instructions. As call instructions are fetched, the sequential address to the call instruction is pushed onto the return stack as a return address. As return instructions are fetched, the most recent return address is popped from the return stack and is used as the return address for that return instruction. Accordingly, if a line predictor entry is terminated by a return instruction, fetch PC generation unit 18D compares the next fetch address from the line predictor entry to the return address provided by return address stack 18C. Similar to the indirect target cache discussion above, if the return address and the next fetch address mismatch, fetch PC generation unit 18D signals line predictor 12 (via the status lines) and generates the return address as the fetch address. The fetch address is searched in line predictor 12 (and translated by ITLB 60 for fetching in I-cache 14).

The above described mechanism may allow for rapid generation of fetch addresses using line predictor 12, with parallel verification of the predicted instruction stream using the branch predictors 18A–18C. If the branch predictors 18A–18C and line predictor 12 agree, then rapid instruction fetching continues. If disagreement is detected, fetch PC generation unit 18D and line predictor 12 may update the affected line predictor entries locally.

On the other hand, certain conditions may not be detected and/or corrected by fetch PC generation unit 18D. Predictor miss decode unit 26 may detect and handle these cases. More particularly, Predictor miss decode unit 26 may decode instruction bytes when a miss is detected in line predictor 12 for a fetch address generated by fetch PC generation unit 18D, when the next line predictor entry indication within a line predictor is invalid, or when the instruction pointers within the line predictor entry are not valid. For the next line predictor indication being invalid, predictor miss decode unit 26 may provide the next fetch address as a search address to line predictor 12. If the next fetch address hits, an indication of the corresponding line predictor entry may be recorded as the next line predictor entry indication. Otherwise, predictor miss decode unit 26 decodes the corresponding instruction bytes (received from alignment unit 12) and generates a line predictor entry for the instructions. Predictor miss decode unit 26 communicates with fetch PC generation unit 18D (via the line predictor update bus shown in FIG. 3) during the generation of line predictor entries.

More particularly, predictor miss decode unit 26 may be configured to access the branch predictors 18A–18C when terminating a line predictor entry with a branch instruction. In the present embodiment, predictor miss decode unit 26 may provide the address of the branch instruction to fetch PC generation unit 18D, which may provide the address as the fetch PC but cancel access to line predictor 12 and ITLB 60. In this manner, the address of the branch instruction may be provided through adder 62 (with a branch offset of zero) to branch predictor 18A and indirect branch target cache 18B). Alternatively, predictor miss decode unit 26 may directly access branch predictors 18A–18D rather than providing the branch instruction address to fetch PC generation unit 18D. The corresponding prediction information may be received by predictor miss decode unit 26 to generate next fetch address information for the generated line predictor entry. For example, if the line predictor entry is terminated by a conditional branch instruction, predictor miss decode unit 26 may use the branch prediction provided by branch predictor 18A to determine whether to use the branch target address or the sequential address as the next fetch address. The next fetch address may be received from indirect branch target cache 18B and may be used as the next fetch address if the line is terminated by an indirect branch instruction. The return address may be used (and popped from return stack 18C) if the line is terminated by a return instruction.

Once the next fetch address is determined for a line predictor entry, predictor miss decode unit 26 may search line predictor 12 for the next fetch address. If a hit is detected, the hitting line predictor entry is recorded for the newly created line predictor entry and predictor miss decode unit 26 may update line predictor 12 with the new entry. If a miss is detected, the next entry to be replaced in line predictor 12 may be recorded in the new entry and predictor miss decode unit 26 may update line predictor 12. In the case of a miss, predictor miss decode unit 26 may continue to decode instructions and generate line predictor entries until a hit in line predictor 12 is detected. In one embodiment, line predictor 12 may employ a first-in, first-out replacement policy for line predictor entries, although any suitable replacement scheme may be used.

It is noted that, in one embodiment, I-cache 14 may provide a fixed number of instruction bytes per instruction fetch, beginning with the instruction byte located by the fetch address. Since a fetch address may locate a byte anywhere within a cache line, I-cache 14 may access two cache lines in response to the fetch address (the cache line indexed by the fetch address, and a cache line at the next index in the cache). Other embodiments may limit the number of instruction bytes provided to up to a fixed number or the end of the cache line, whichever comes first. In one embodiment, the fixed number is 16 although other embodiments may use a fixed number greater or less than 16. Furthermore, in one embodiment, I-cache 14 is set-associative. Set-associative caches provide a number of possible storage locations for a cache line identified by a particular address. Each possible storage location is a "way" of the set-associative cache. For example, in one embodiment, I-cache 14 may be 4 way set-associative and hence a particular cache line may be stored in one of 4 possible storage locations. Set-associative caches thus use two input values (an index derived from the fetch address and a way determined by comparing tags in the cache to the remaining portion of the fetch address) to provide output bytes. Rather than await the completion of tag comparisons to determine the way, line predictor 12 may store a way prediction (provided to I-cache 14 as the way prediction shown in FIG. 3). The predicted way may be selected as the output, and the predicted way may be subsequently verified via the tag comparisons. If the predicted way is incorrect, I-cache 14 may search the other ways for a hit. The hitting way may then be recorded in line predictor 12. Way prediction may also allow for power savings by only activating the portion of the I-cache memory comprising the predicted way (and leaving the remaining memory corresponding to the unpredicted ways idle). For embodiments in which two cache lines are accessed to provide the fixed number of bytes, two way predictions may be provided by line predictor 12 for each fetch address.

It is further noted that processor 10 may support a mode in which line predictor 12 and the branch predictors are disabled. In such a mode, predictor miss decode unit 26 may provide instructions to map unit 30. Such a mode may be used for debugging, for example.

As used herein, a branch instruction is an instruction which may cause the next instruction to be fetched to be one of two addresses: the branch target address (specified via operands of the instruction) or the sequential address (which is the address of the instruction immediately subsequent to the branch instruction in memory). It is noted that the term "control transfer instruction" may also be used in this manner. Conditional branch instructions select one of the branch target address or sequential address by testing an operand of the branch instruction (e.g. condition flags). An unconditional branch instruction, by contrast, always causes instruction fetching to continue at the branch target address. Indirect branch instructions, which may generally be conditional or unconditional, generate their branch target address using at least one non-immediate operand (register or memory operands). As opposed to direct branch instructions (which generate their targets from immediate data such as a branch displacement included within the branch instruction), indirect branch instructions have a branch target address which is not completely determinable until the operands are fetched (from registers or memory). Finally, return instructions are instructions which have a branch target address corresponding to the most recently executed call instruction. Call instructions and return instructions may be used to branch to and from subroutines, for example.

As used herein, an "address" is a value which identifies a byte within a memory system to which processor 10 is couplable. A "fetch address" is an address used to fetch instruction bytes to be executed as instructions within processor 10. As mentioned above, processor 10 may employ an address translation mechanism in which virtual addresses (generated in response to the operands of instructions) are translated to physical addresses (which physically identify locations in the memory system). In the x86 instruction set architecture, virtual addresses may be linear addresses generated according to a segmentation mechanism operating upon logical addresses generated from operands of the instructions. Other instruction set architectures may define the virtual address differently.

Figure 4:
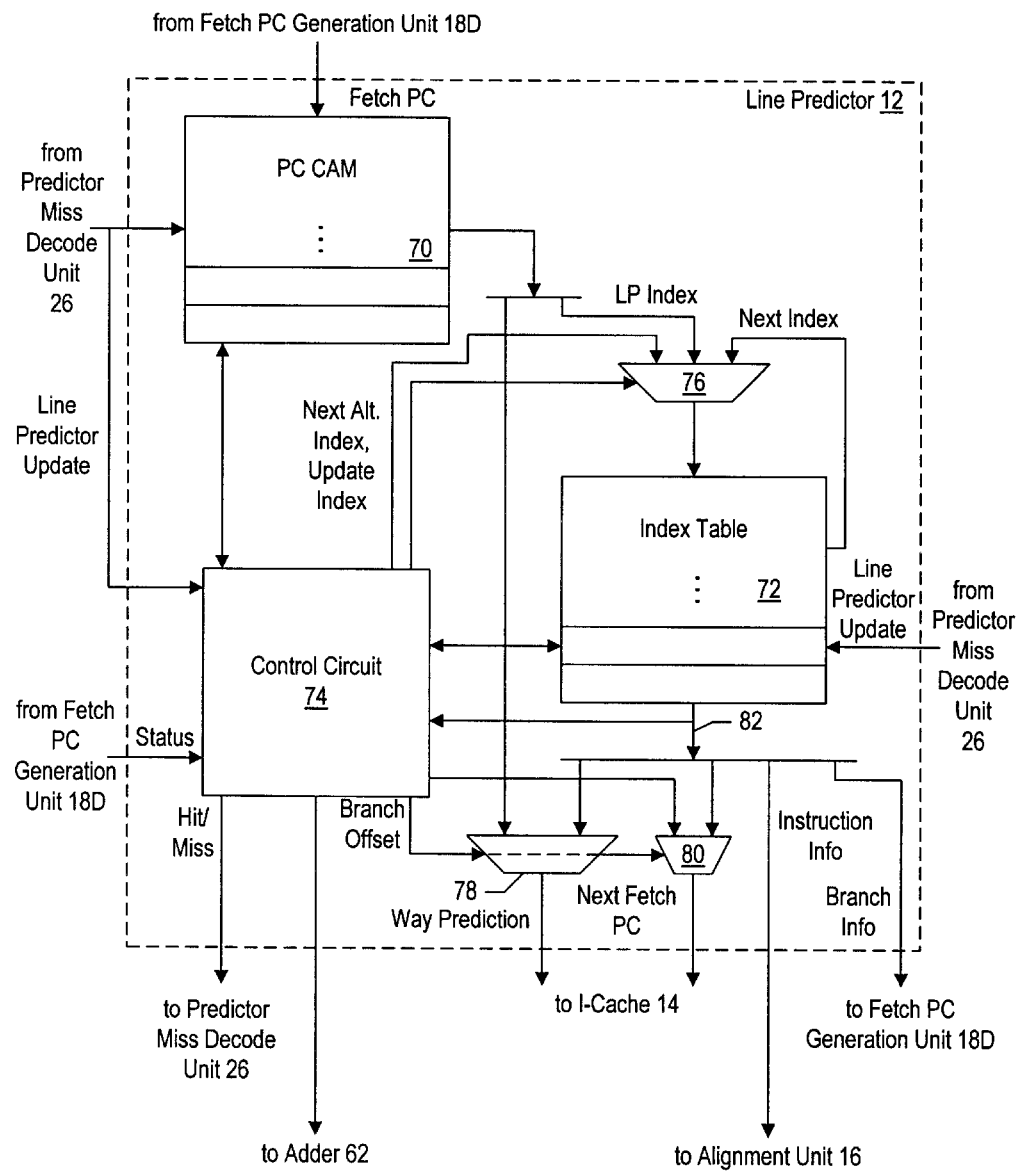
FIG. 4 is a block diagram of one embodiment of a line predictor.

Turning next to FIG. 4, a block diagram of one embodiment of line predictor 12 is shown. Other embodiments are possible and contemplated. In the embodiment of FIG. 4, line predictor 12 includes a PC CAM 70, an index table 72, control circuit 74, an index mux 76, a way prediction mux 78, and a next fetch PC mux 80. Control circuit 74 is coupled to PC CAM 70, index table 72, muxes 76, 78, and 80, fetch PC generation unit 18D, predictor miss decode unit 26, and adder 62. PC CAM 70 is further coupled to predictor miss decode unit 26, fetch PC generation unit 18D, and muxes 76 and 78. Index table 72 is further coupled to muxes 76, 78, and 80, alignment unit 16, fetch PC generation unit 18D, and predictor miss decode unit 26.

Generally, the embodiment of line predictor 12 illustrated in FIG. 4 includes two memories for storing line predictor entries. The first memory is PC CAM 70, which is used to search for fetch addresses generated by fetch PC generation unit 18D. If a hit is detected for a fetch address, PC CAM 70 provides an index (LP index in FIG. 4) into index table 72 (the second memory). Index table 72 stores the line predictor information for the line predictor entry, including instruction alignment information (e.g. instruction pointers) and next entry information. In response to the index from PC CAM 70, index table 72 provides an output line predictor entry 82 and a next index for index table 72. The next index selects a second entry within index table 72, which provides: (i) instruction alignment information for the instructions fetched by the next fetch address; and (ii) yet another next fetch address. Line predictor 12 may then continue to generate next fetch addresses, alignment information, and a next index from index table 72 until: (i) a next index is selected which is invalid (i.e. does not point to a next entry in index table 72); (ii) status signals from fetch PC generation unit 18D indicate a redirection (due to trap, or a prediction by the branch predictors which disagrees with the prediction recorded in the index table, etc.); or (iii) decode units 24A–24D detect incorrect alignment information provided by line predictor 12.

Viewed in another way, the next index stored in each line predictor entry is a link to the next line predictor entry to be fetched. As long as the next link is valid, a check that the fetch address hits in PC CAM 70 (identifying a corresponding entry within index table 72) may be skipped. Power savings may be achieved by keeping PC CAM 70 idle during clock cycles that the next index is being selected and fetched. More particularly, control circuit 74 may keep PC CAM 70 in an idle state unless fetch PC generation unit 18D indicates a redirection to the fetch PC generated by fetch PC generation unit 18D, a search of PC CAM 70 is being initiated by predictor miss decode unit 26 to determine a next index, or control circuit 74 is updating PC CAM 70.

Control circuit 74 controls index mux 76 to select an index for index table 72. If PC CAM 70 is being searched and a hit is detected for the fetch address provided by fetch PC generation unit 18D, control circuit 74 selects the index provided by PC CAM 70 through index mux 76. On the other hand, if a line predictor entry has been fetched and the next index is valid in the line predictor entry, control circuit 74 selects the next index provided by index table 72. Still further, if the branch prediction stored in a particular line predictor entry disagrees with the branch prediction from the branch predictors or an update of index table 72 is to be performed, control circuit 74 provides an update index to index mux 76 and selects that index through index mux 76. In embodiments employing way prediction, a way misprediction (detected by I-cache 14 by comparing the tag of the predicted way to the corresponding fetch address) may result in an update to correct the way predictions.

If a miss occurs in either PC CAM 70 or index table 72, line predictor miss decode unit 26 may decode the instruction bytes fetched in response to the missing fetch address and provide line predictor entries via the line predictor update lines shown in FIGS. 3 and 4. Control circuit 74 receives signals from the line predictor update lines indicating the type of update being provided (PC CAM, index table, or both) and selects an entry in the corresponding memories to store the updated entries. In one embodiment, control circuit 74 employs a FIFO replacement scheme within PC CAM 70 and index table 72. Other embodiments may employ different replacement schemes, as desired. If index table 72 is being updated, control circuit 74 provides the update index to index mux 76 and selects the update index. Control circuit 74 also provides an indication of the entry being updated to PC CAM 70 if PC CAM 70 is being updated.

Additionally, control circuit 74 may provide an update index to update a line predictor entry in index table 72 if the branch prediction for the line predictor entry disagrees with the branch predictors 18A–18C. Fetch PC generation unit 18D indicates, via the status lines, that a prediction disagreement has occurred. Control circuit 74 captures the line predictor entries read from index table 72, and may modify prediction information in response to the status signals and may update index table 72 with the information. These updates are illustrated in the timing diagrams below and will be discussed in more detail then.

Predictor miss decode unit 26 may be configured to search PC CAM 70 for the next fetch address being assigned to a line predictor entry being generated therein, in order to provide the next index (within index table 72) for that line predictor entry. Predictor miss decode unit 26 may provide the next fetch address using the line predictor update lines, and may receive an indication of the hit/miss for the search (hit/miss lines) and the LP index from the hitting entry (provided by control circuit 74 on the line predictor update lines). Alternatively, control circuit 74 may retain the LP index from the hitting entry and use the index as the next index when updating the entry in index table 72.

Figure 6:
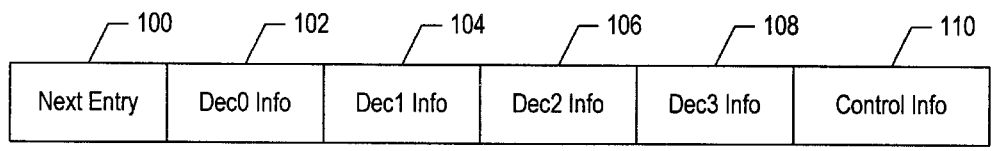
FIG. 6 is a diagram illustrating one embodiment of an entry in an Index Table shown in FIG. 4.
Figure 7:
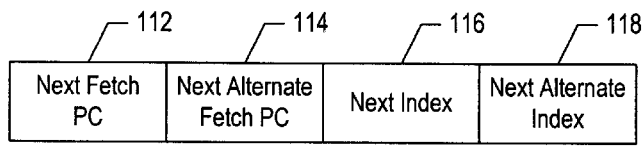
FIG. 7 is a diagram illustrating one embodiment of a next entry field shown in FIG. 6.
Figure 8:
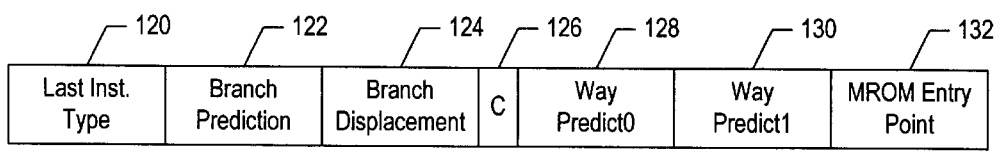
FIG. 8 is a diagram illustrating one embodiment of a control information field shown in FIG. 6.

Generally, PC CAM 70 comprises a plurality of entries to be searched by a fetch address (from fetch PC generation unit 18D, or from predictor miss decode unit 26 for training line predictor entries). An exemplary PC CAM entry is shown below in FIG. 5. Similarly, index table 72 comprises a plurality of entries (referred to herein as line predictor entries) which store alignment information (e.g. instruction pointers), next fetch information, and control information regarding the termination of the entry. An exemplary line predictor entry is shown in FIGS. 6, 7, and 8 below. Index table 72 provides the next index from the line predictor entry to index mux 76 (as described above) and further provides the entry (including the next index) as output line predictor entry 82. The output line predictor entry 82 is provided to control circuit 74, and portions of the output line predictor entry 82 are shown separated in FIG. 4 to be provided to various other portions of processor 10.

More particularly, the instruction pointers stored in the entry are provided to alignment unit 16, which associates the instruction pointers with the corresponding instruction bytes and aligns the instruction bytes in response thereto. Additionally, information regarding the terminating instruction identified by the line predictor entry (e.g. whether or not it is a branch, the type of branch if it is a branch, etc.) is transmitted to fetch PC generation unit 18D (branch info in FIGS. 3 and 4). The information may be used to determine which of the branch predictors is to verify the branch prediction in the line predictor. Additionally, the branch information may include an indication of the branch displacement and the taken/not taken prediction from the entry, as described above.

The next fetch address from the entry is provided to next fetch PC mux 80, and may be selected by control circuit 74 through next fetch PC mux 80 to be provided to I-cache 14. Additionally, control circuit 74 provides an input to next fetch PC mux 80. Control circuit 74 may provide the next fetch address in cases in which the branch prediction stored in a line predictor entry disagrees with branch predictors 18A–18C. The next fetch address provided by control circuit 74 may be the next alternate fetch address from the affected entry (and control circuit 74 may also update the affected entry).

Line predictor entry 82 also includes way predictions corresponding to the next fetch address (as described above, although other embodiments may not employ way predictions, as desired). The way predictions are provided to way prediction mux 78. Additionally, way predictions for a fetch address searched in PC CAM 70 are provided by PC CAM 70 as the other input to way prediction mux 78. Control circuit 74 selects the way predictions from PC CAM 70 if a fetch address is searched in PC CAM 70 and hits. Otherwise, the way predictions from line predictor entry 82 are selected. The selected way predictions are provided to I-cache 14. It is noted that I-cache 14 may verify the way predictions by performing a tag comparison of the fetch address to the predicted way. If a way prediction is found to be incorrect, I-cache 14 is reaccessed with the fetch address to determine the correct way and fetch the correct instruction bytes. Additionally, line predictor 12 is updated to correct the way prediction.

Control circuit 74 is further configured to generate the branch offset for adder 62 from the information in the line predictor entry. More particularly, control circuit 74 determines which of the instruction pointers identifies the last valid instruction within the line predictor entry, and generates the branch offset from that instruction pointer. For example, the instruction pointer may be an offset, and hence control circuit 74 may select the instruction pointer corresponding to the terminating instruction as the branch offset. Alternatively, the instruction pointers may be lengths of the instructions. The instruction pointers of each instruction prior to the terminating instruction may be added to produce the branch offset.

In one particular embodiment, PC CAM 70 may comprise a content addressable memory (CAM) and index table 72 may comprise a random access memory (RAM). In a CAM, at least a portion of each entry in the memory is coupled to a comparator within the CAM which compares the portion to an input value, and if a match is detected a hit signal is asserted by the CAM. Additionally, if only a portion of the entry is compared, the remainder of the hitting entry may be provided as an output. In the embodiment shown, the portion of the entry compared may be the stored fetch addresses and the remainder may be the way predictions and LP index. In one particular embodiment, only a portion of the fetch address may be compared in the CAM. For example, a plurality of least significant bits of the fetch address may be compared. Such an embodiment allows aliasing of certain fetch addresses which have the same least significant bits but differ in the most significant bits. Accordingly, the number of bits compared may be selected as a trade-off between the amount of allowable aliasing and the amount of power expended in performing the comparisons (since each entry is compared to the input value concurrently). The process of accessing a CAM with a value and performing the comparisons to the stored values is referred to herein is "camming". On the other hand, a RAM selects an entry by decoding an input value (e.g. an index) and provides the selected entry as an output.

As used herein, an entry in a memory is one location provided by the memory for storing a type of information. A memory comprises a plurality of the entries, each of which may be used to store information of the designated type. Furthermore, the term control circuit is used herein to refer to any combination of circuitry (e.g. combinatorial logic gates, data flow elements such as muxes, registers, latches, flops, adders, shifters, rotators, etc., and/or circuits implementing state machines) which operates on inputs and generates outputs in response thereto as described.

It is noted that, while the embodiment of FIG. 4 shows two memories, other embodiments may implement a single memory within line predictor 12. The memory may include a CAM portion to be searched in response to the fetch address, and a RAM portion which stores the corresponding line predictor entry. The line predictor entries may provide a next fetch address which may be cammed against the memory to find the next hit (or a next index identifying the next entry). It is further noted that one or both of the CAM portion and the RAM portion may be banked to conserve power. For example, 8 banks could be used. In such an embodiment, the least significant 3 bits of the fetch address may select the bank, and the remainder of the address may be cammed.

The discussion herein may occasionally refer to "misses" in line predictor 12. For the embodiment of FIG. 4, a line predictor miss may be a miss in PC CAM 70, or a hit in PC CAM 70 but the corresponding line predictor entry includes invalid alignment information. Additionally, a next index may be invalid, and the next fetch address may be considered to be a miss in line predictor 12.

Figure 5:
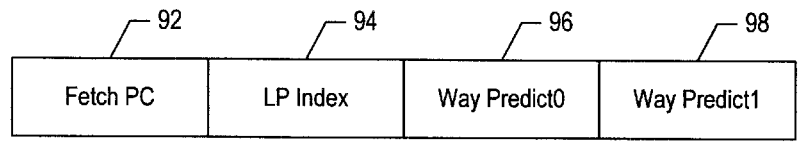
FIG. 5 is a diagram illustrating one embodiment of an entry in a PC CAM shown in FIG. 4.

Turning now to FIG. 5, a diagram illustrating an exemplary entry 90 for PC CAM 70 is shown. Other embodiments of PC CAM 70 may employ entries 90 including more information, less information, or substitute information to the information shown in the embodiment of FIG. 5. In the embodiment of FIG. 5, entry 90 includes a fetch address field 92, a line predictor index field 94, a first way prediction field 96, and a second way prediction field 98.

Fetch address field 92 stores the fetch address locating the first byte for which the information in the corresponding line predictor entry is stored. The fetch address stored in fetch address field 92 may be a virtual address for comparison to fetch addresses generated by fetch PC generation unit 18D. For example, in embodiments of processor employing the x86 instruction set architecture, the virtual address may be a linear address. As mentioned above, a least significant portion of the fetch address may be stored in fetch address field 92 and may be compared to fetch addresses generated by fetch PC generation unit 18D. For example, in one particular embodiment, the least significant 18 to 20 bits may be stored and compared.

A corresponding line predictor entry within index table 72 is identified by the index stored in line predictor index field 94. Furthermore, way predictions corresponding to the fetch address and the address of the next sequential cache line are stored in way prediction fields 96 and 98, respectively.

Turning next to FIG. 6, an exemplary line predictor entry 82 is shown. Other embodiments of index table 72 may employ entries 82 including more information, less information, or substitute information to the information shown in the embodiment of FIG. 6. In the embodiment of FIG. 6, line predictor entry 82 includes a next entry field 100, a plurality of instruction pointer fields 102–108, and a control field 110.

Next entry field 100 stores information identifying the next line predictor entry to be fetched, as well as the next fetch address. One embodiment of next entry field 100 is shown below (FIG. 7). Control field 110 stores control information regarding the line of instructions, including instruction termination information and any other information which may be used with the line of instructions. One embodiment of control field 110 is illustrated in FIG. 8 below.

Each of instruction pointer fields 102–108 stores an instruction pointer for a corresponding decode unit 24A–24D. Accordingly, the number of instruction pointer fields 102–108 may be the same as the number of decode units provided within various embodiments of processor 10. Viewed in another way, the number of instruction pointers stored in a line predictor entry may be the maximum number of instructions which may be concurrently decoded (and processed to the schedule stage) by processor 10. Each instruction pointer field 102–108 directly locates an instruction within the instruction bytes (as opposed to predecode data, which is stored on a byte basis and must be scanned as a whole before any instructions can be located). In one embodiment, the instruction pointers may be the length of each instruction (which, when added to the address of the instruction, locates the next instruction). A length of zero may indicate that the next instruction is invalid. Alternatively, the instruction pointers may comprise offsets from the fetch address (and a valid bit to indicate validity of the pointer). In one specific embodiment, instruction pointer 102 (which locates the first instruction within the instruction bytes) may comprise a length of the instruction, and the remaining instruction pointers may comprise offsets and valid bits.

In one embodiment, microcode unit 28 is coupled only to decode unit 24D (which corresponds to instruction pointer field 108). In such an embodiment, if a line predictor entry includes an MROM instruction, the MROM instruction is located by instruction pointer field 108. If the line of instructions includes fewer than the maximum number of instructions, the MROM instruction is located by instruction pointer field 108 and one or more of the instruction pointer fields 102–106 are invalid. Alternatively, the MROM instruction may be located by the appropriate instruction pointer field 102–108 based on the number of instructions in the line, and the type field 120 (shown below) may indicate that the last instruction is an MROM instruction and thus is to be aligned to decode unit 24D.

Turning now to FIG. 7, an exemplary next entry field 100 is shown. Other embodiments of next entry field 100 may employ more information, less information, or substitute information to the information shown in the embodiment of FIG. 7. In the embodiment of FIG. 7, next entry field 100 comprises a next fetch address field 112, a next alternate fetch address field 114, a next index field 116, and a next alternate index field 118.

Next fetch address field 112 stores the next fetch address for the line predictor entry. The next fetch address is provided to next fetch address mux 80 in FIG. 4, and is the address of the next instructions to be fetched after the line of instructions in the current entry, according to the branch prediction stored in the line predictor entry. For lines not terminated with a branch instruction, the next fetch address may be the sequential address to the terminating instruction. The next index field 116 stores the index within index table 72 of the line predictor entry corresponding to the next fetch address (i.e. the line predictor entry storing instruction pointers for the instructions fetched in response to the next fetch address).

Next alternate fetch address field 114 (and the corresponding next alternate index field 118) are used for lines which are terminated by branch instructions (particularly conditional branch instructions). The fetch address (and corresponding line predictor entry) of the non-predicted path for the branch instruction are stored in the next alternate fetch address field 114 (and the next alternate index field 118). In this manner, if the branch predictor 18A disagrees with the most recent prediction by line predictor 12 for a conditional branch, the alternate path may be rapidly fetched (e.g. without resorting to predictor miss decode unit 26). Accordingly, if the branch is predicted taken, the branch target address is stored in next fetch address field 112 and the sequential address is stored in next alternate fetch address field 114. On the other hand, if the branch is predicted not taken, the sequential address is stored in next fetch address field 112 and the branch target address is stored in next alternate fetch address field 114. Corresponding next indexes are stored as well in fields 116 and 118.

In one embodiment, next fetch address field 112 and next alternate fetch address field 114 store physical addresses for addressing I-cache 14. In this manner, the time used to perform a virtual to physical address translation may be avoided as lines of instructions are fetched from line predictor 12. Other embodiments may employ virtual addresses in these fields and perform the translations (or employ a virtually tagged cache). It is noted that, in embodiments employing a single memory within line predictor 12 (instead of the PC CAM and index table), the index fields may be eliminated since the fetch addresses are searched in the line predictor. It is noted that the next fetch address and the next alternate fetch address may be a portion of the fetch address. For example, the in-page portions of the addresses may be stored (e.g. the least significant 12 bits) and the full address may be formed by concatenating the current page to the stored portion.

Turning next to FIG. 8, an exemplary control field 110 is shown. Other embodiments of control field 110 may employ more information, less information, or substitute information to the information shown in the embodiment of FIG. 8. In the embodiment of FIG. 8, control field 110 includes a last instruction type field 120, a branch prediction field 122, a branch displacement field 124, a continuation field 126, a first way prediction field 128, a second way prediction field 130, and an entry point field 132.

Last instruction type field 120 stores an indication of the type of the last instruction (or terminating instruction) within the line of instructions. The type of instruction may be provided to fetch PC generation unit 18D to allow fetch PC generation unit 18D to determine which of branch predictors 18A–18C to use to verify the branch prediction within the line predictor entry. More particularly, last instruction type field 120 may include encodings indicating sequential fetch (no branch), microcode instruction, conditional branch instruction, indirect branch instruction, call instruction, and return instruction. The conditional branch instruction encoding results in branch predictor 18A being used to verify the direction of the branch prediction. The indirect branch instruction encoding results in the next fetch address being verified against indirect branch target cache 18B. The return instruction encoding results in the next fetch address being verified against return stack 18C.

Branch prediction field 122 stores the branch prediction recorded by line predictor 12 for the branch instruction terminating the line (if any). Generally, fetch PC generation unit 18D verifies that the branch prediction in field 122 matches (in terms of taken/not taken) the prediction from branch predictor 18A. In one embodiment, branch prediction field 122 may comprise a bit with one binary state of the bit indicating taken (e.g. binary one) and the other binary state indicating not taken (e.g. binary zero). If the prediction disagrees with branch predictor 122, the prediction may be switched. In another embodiment, branch prediction field 122 may comprise a saturating counter with the binary state of the most significant bit indicating taken/not taken. If the taken/not taken prediction disagrees with the prediction from branch predictor 18A, the saturating counter is adjusted by one in the direction of the prediction from branch predictor 18A (e.g. incremented if taken, decremented if not taken). The saturating counter embodiment may more accurately predict loop instructions, for example, in which each N−1 taken iterations (where N is the loop count) is followed by one not taken iteration.

Branch displacement field 124 stores an indication of the branch displacement corresponding to a direct branch instruction. In one embodiment, branch displacement field 124 may comprise an offset from the fetch address to the first byte of the branch displacement. Fetch PC generation unit 18D may use the offset to locate the branch displacement within the fetched instruction bytes, and hence may be used to select the displacement from the fetched instruction bytes. In another embodiment, the branch displacement may be stored in branch displacement field 124, which may be directly used to determine the branch target address.

In the present embodiment, the instruction bytes represented by a line predictor entry may be fetched from two consecutive cache lines of instruction bytes. Accordingly, one or more bytes may be in a different page than the other instruction bytes. Continuation field 126 is used to signal the page crossing, so that the fetch address corresponding to the second cache line may be generated and translated. Once a new page mapping is available, other fetches within the page have the correct physical address as well. The instruction bytes in the second page are then fetched and merged with the instruction bytes within the first page. Continuation field 126 may comprise a bit indicative, in one binary state, that the line of instructions crosses a page boundary, and indicative, in the other binary state, that the line of instructions does not cross a page boundary. Continuation field 126 may also be used to signal a branch target address which is in a different page than the branch instruction.

Similar to way prediction fields 96 and 98, way prediction fields 128 and 130 store the way predictions corresponding to the next fetch address (and the sequential address to the next fetch address). Finally, entry point field 132 may store an entry point for a microcode instruction within the line of instructions (if any). An entry point for microcode instructions is the first address within the microcode ROM at which the microcode routine corresponding to the microcode instruction is stored. If the line of instructions includes a microcode instruction, entry point field 132 stores the entry point for the instruction. Since the entry point is stored, decode unit 24D may omit entry point decode hardware and instead directly use the stored entry point. The time used to decode the microcode instruction to determine the entry point may also be eliminated during the fetch and dispatch of the instruction, allowing for the microcode routine to be entered more rapidly. The stored entry point may be verified against an entry point generated in response to the instruction (by decode unit 24D or MROM unit 28).

Turning now to FIG. 9, a table 134 illustrating termination conditions for a line of instructions according to one embodiment of processor 10 is shown. Other embodiments are possible and contemplated. In creating a line predictor entry by decoding instructions, line predictor miss decode unit 26 terminates the line (updating line predictor 12 with the entry) in response to detecting any one of the line termination conditions listed in FIG. 9.

As table 134 illustrates, a line is terminated in response to decoding either a microcode instruction or a branch instruction. Also, if a predetermined maximum number of instructions have been decoded (e.g. four in the present embodiment, matching the four decode units 24A–24D), the line is terminated. In determining the maximum number of instructions decoded, instructions which generate more than two instruction operations (and which are not microcode instructions, which generate more than four instruction operations) are counted as two instructions. Furthermore, a line is terminated if a predetermined maximum number of instruction bytes are decoded (e.g. 16 bytes in the present embodiment, matching the number of bytes fetched from I-cache 14 during a clock cycle). A line is also terminated if the number of instruction operations generated by decoding instructions within the line reaches a predefined maximum number of instruction operations (e.g. 6 in the present embodiment). Moreover, a line is terminated if a page crossing is detected while decoding an instruction within the line (and the continuation field is set). Finally, the line is terminated if the instructions within the line update a predefined maximum number of destination registers. This termination condition is set such that the maximum number of register renames that map unit 30 may assign during a clock cycle is not exceeded. In the present embodiment, 4 renames may be the maximum.

Viewed in another way, the termination conditions for predictor miss decode unit 26 in creating line predictor entries are flow control conditions for line predictor 12. In other words, line predictor 12 identifies a line of instructions in response to each fetch address. The line of instructions does not violate the conditions of table 134, and thus is a line of instruction that the hardware within the pipeline stages of processor 10 may be designed to handle. Difficult-to-handle combinations, which might otherwise add significant hardware (to provide concurrent handling or to provide stalling and separation of the instructions flowing through the pipeline) may be separated to different lines in line predictor 12 and thus, the hardware for controlling the pipeline in these circumstances may be eliminated. A line of instructions may flow through the pipeline as a unit. Although pipeline stalls may still occur (e.g. if the scheduler is full, or if a microcode routine is being dispatched, or if map unit 30 does not have rename registers available), the stalls hold the progress of the instructions as a unit. Furthermore, stalls are not the result of the combination of instructions within any particular line. Pipeline control may be simplified. In the present embodiment, line predictor 12 is a flow control mechanism for the pipeline stages up to scheduler 36. Accordingly, one microcode unit is provided (decode unit 24D and MROM unit 28), branch prediction/fetch PC generation unit 18 is configured to perform one branch prediction per clock cycle, a number of decode units 24A–24D is provided to handle the maximum number of instructions, I-cache 14 delivers the maximum number of instruction bytes per fetch, scheduler 36 receives up to the maximum number of instruction operations per clock cycle, and map unit 30 provides up to the maximum number of rename registers per clock cycle.

Timing Diagrams

Turning next to FIGS. 10–21, a set of timing diagrams are shown to illustrate operation of one embodiment of line predictor 12 within the instruction processing pipeline shown in FIG. 2. Other embodiments of line predictor 12 may operate within other pipelines, and the number of pipeline stages may vary from embodiment to embodiment. If a lower clock frequency is employed, stages may be combined to form fewer stages.

Generally, each timing diagram illustrates a set of clock cycles delimited by vertical dashed lines, with a label for the clock cycle above and between (horizontally) the vertical dashed lines for that clock cycle. Each clock cycle will be referred to with the corresponding label. The pipeline stage labels shown in FIG. 2 are used in the timing diagrams, with a subscript used to designate different lines fetched from line predictor 12 (e.g. a subscript of zero refers to a first line, a subscript of 1 refers to a second line predicted by the first line, etc.). While the subscripts may be shown in increasing numerical order, this order is intended to indicate that fetch order and not the particular entries within index table 72 which store the line predictor entries. Generally, the line predictor entries may be randomly located within index table 72 with respect to their fetch order. Instead, the order is determined by the order in which the entries are created. Various operations of interest may be illustrated in the timing diagrams as well, and these operations are described with respect to the corresponding timing diagram.

Figure 16:
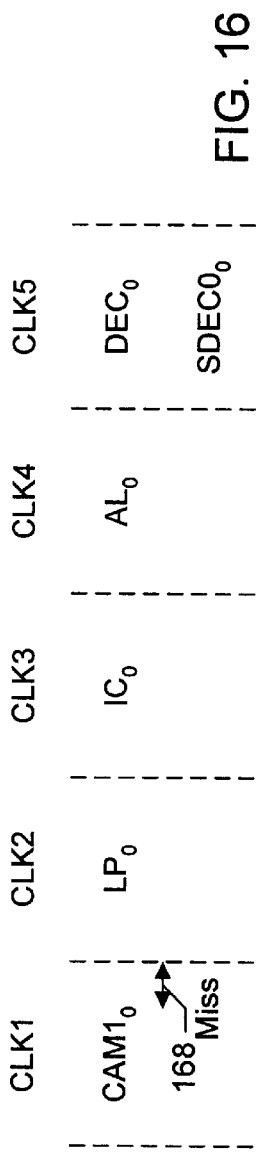
FIG. 16 is a timing diagram illustrating operation of one embodiment of the line predictor and the predictor miss decode unit for a line predictor miss.
Figure 17:
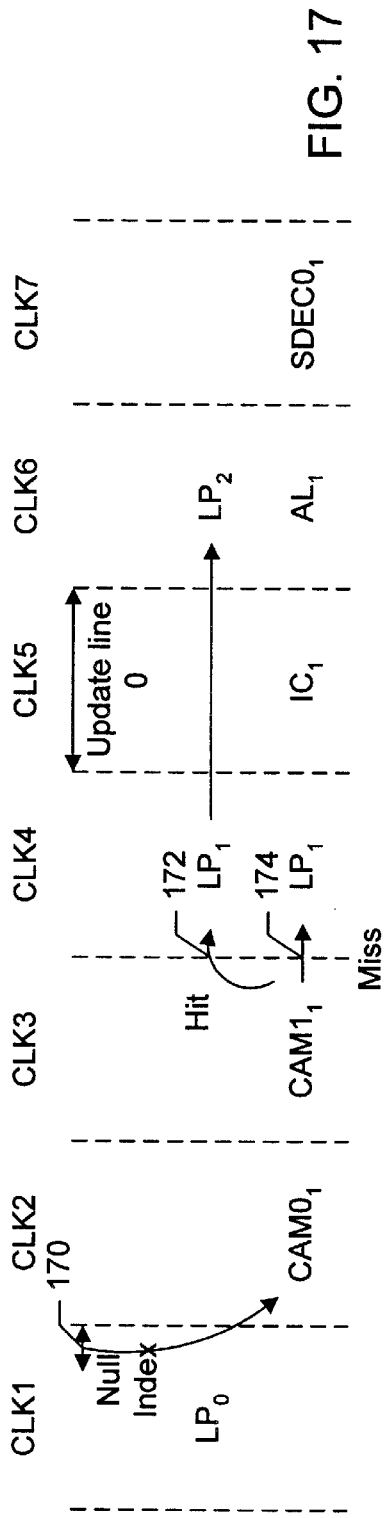
FIG. 17 is a timing diagram illustrating operation of one embodiment of the line predictor and the predictor miss decode unit for a null next index in the line predictor.
Figure 18:
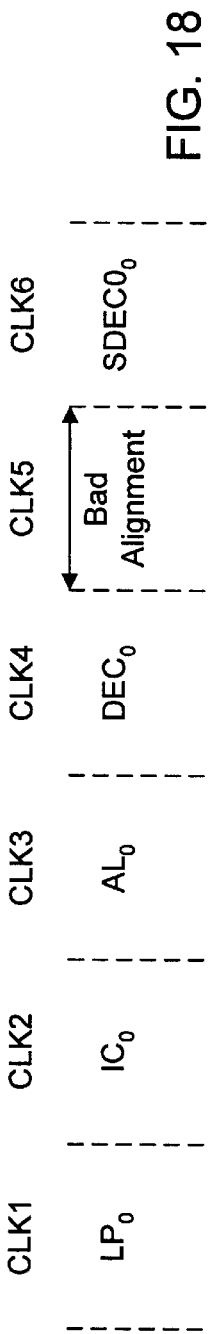
FIG. 18 is a timing diagram illustrating operation of one embodiment of the line predictor and the predictor miss decode unit for a line predictor entry having incorrect alignment information.
Figure 19:
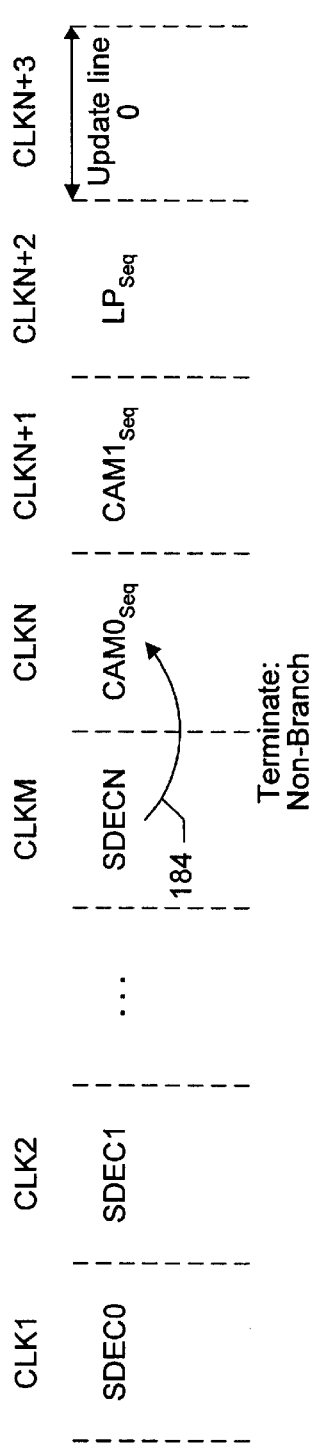
FIG. 19 is a timing diagram illustrating operation of one embodiment of the line predictor and the predictor miss decode unit for generating an entry terminated by an MROM instruction or a non-branch instruction.
Figure 20:
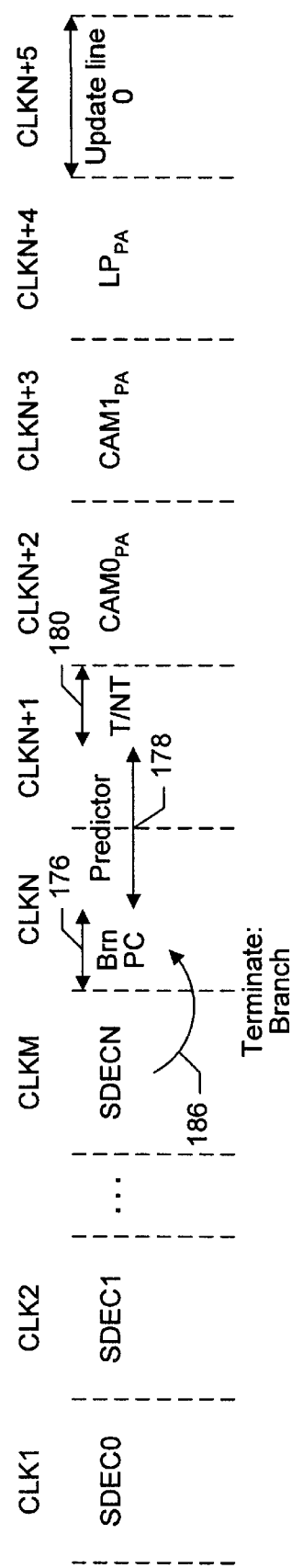
FIG. 20 is a timing diagram illustrating operation of one embodiment of the line predictor and the predictor miss decode unit for generating an entry terminated by a branch instruction.
Figure 21:
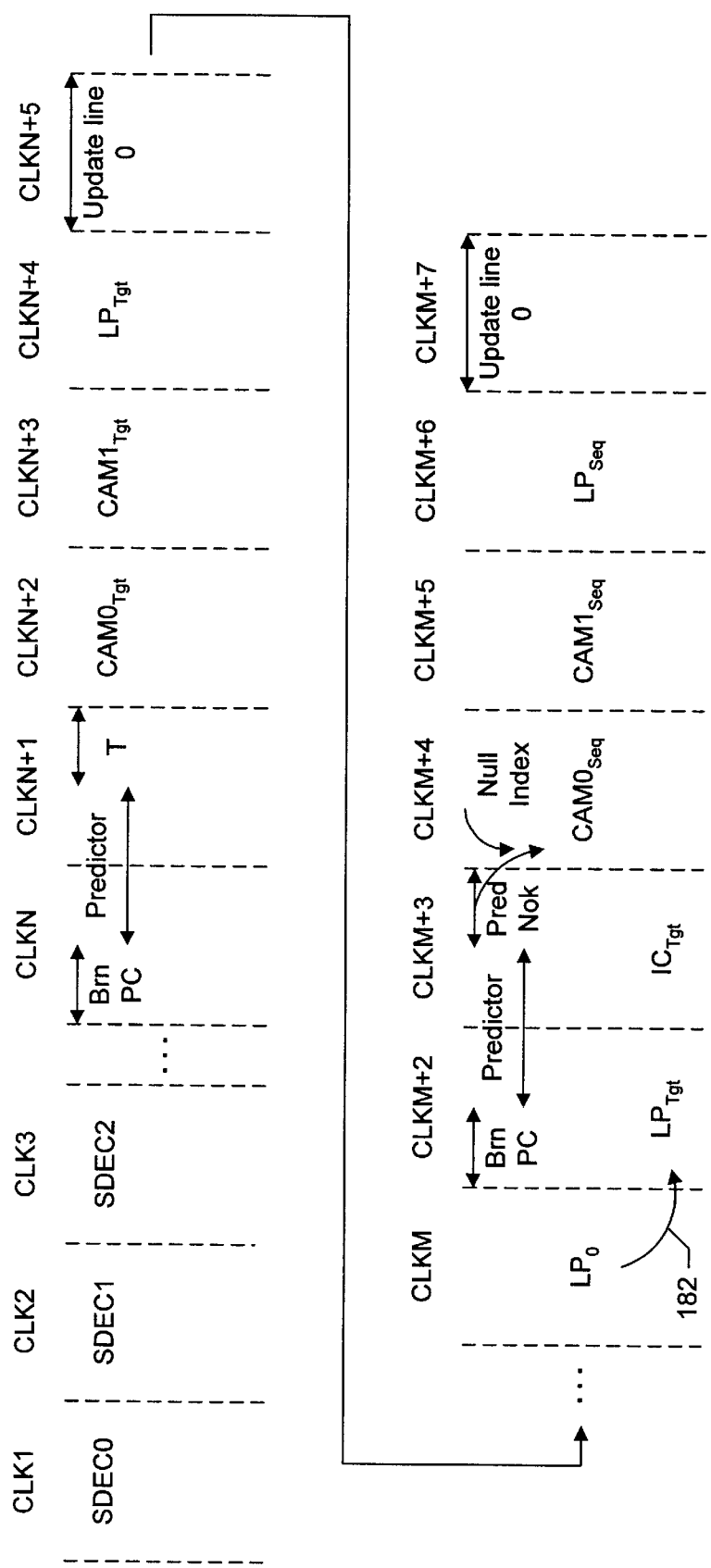
FIG. 21 is a timing diagram illustrating operation of one embodiment of the line predictor and the predictor miss decode unit for training a line predictor entry terminated by a branch instruction for both next fetch PCs and indexes.

FIG. 10 illustrates the case in which fetches are hitting in line predictor 12 and branch predictions are agreeing with the branch predictions stored in the line predictor for conditional branches and indirect branches. FIG. 13 illustrates the case in which a return instruction prediction agrees with return stack 18C. FIGS. 11, 12, and 14 illustrate conditions in which line predictor 12 and branch prediction/fetch PC generation unit 18 handle the training of line predictor entries. FIG. 15 illustrates the use of the continuation field for page crossings. FIGS. 16–18 illustrate various conditions which cause predictor miss decode unit 26 to initiate generation of a line predictor entry. FIGS. 19 and 20 illustrate generation of a line predictor entry terminating in a non-branch type instruction (e.g. a microcode instruction or a non-branch instruction) and a branch instruction, respectively. FIG. 21 illustrates the training of both target (or taken) and sequential (or not taken) paths for a branch instruction. It is noted that each timing diagram illustrates the first line fetched (subscript 0) beginning with the line predictor (LP) stage. The first line fetched may be the result of camming a fetch address, a valid next index field, or a next alternate fetch index field following a branch predictor disagreement.

Each timing diagram will next be individually described. FIG. 10 illustrates fetching of several line predictor entries within a predicted instruction stream. Line 0 is terminated by a conditional branch, and is fetched from line predictor 12 during clock cycle CLK1. The next index of line 0 indicates line 1 (arrow 140), and line 1 is fetched from the line predictor during clock cycle CLK2. Similarly, line 1 further indicates line 2 (arrow 142), and line 2 is fetched from the line predictor during clock cycle CLK3. Line 2 further indicates line 3 (arrow 144), and line 3 is fetched from the line predictor during clock cycle CLK4. Each line proceeds through subsequent stages during subsequent clock cycles as illustrated in FIG. 10. Arrows similar to arrows 140–144 are used throughout the timing diagrams to indicate that a line predictor entry identifies the next line predictor entry via the next index field.

Since line 0 is terminated by a conditional branch, control circuit 74 generates the branch offset corresponding to the predicted branch instruction from the corresponding instruction pointer and provides the offset to adder 62, which adds the offset to the fetch address provided by fetch PC generation unit 18D (arrow 146). The resulting branch instruction address is provided to branch predictor 18A, which selects a branch prediction (arrow 148). Fetch PC generation unit 18D compares the branch prediction from branch predictor 18A (in response to the branch information received from line predictor 12 indicating that a conditional branch terminates the line), and determines that the predictions agree (arrow 150). Fetch PC generation unit 18D provides status on the status lines to line predictor 12 indicating that the prediction is correct. Accordingly, fetching continues as directed by the next index fields. It is noted that, since the branch prediction for line 0 is not verified until clock cycle CLK3, the fetches of lines 1 and 2 are speculative and may be cancelled if the predictions are found to disagree (as illustrated in FIG. 11, for example). Verifying the prediction for a line terminated in an indirect branch instruction may be similar to the timing of FIG. 11, but fetch PC generation unit 18D may verify the branch target address against indirect branch target cache 18B instead of the branch prediction against branch predictor 18A (again, in response to the branch information indicating a indirect branch). In embodiments in which indirect branch instructions are conditional, both verifications may be performed.

By way of contrast, FIG. 13 illustrates a case in which line 0 is terminated by a return instruction. Since return instructions select the return address corresponding to the most recent call instruction and return stack 18C is a stack of return addresses with the most recent return address provided from the top of return stack 18C, fetch PC generation unit 18D compares the most recent return address to the next fetch address generated by line predictor 12 (arrow 152). In the example of FIG. 13, the return address and next fetch address match, and fetch PC generation unit 18D returns status to line predictor 12 indicating that the prediction is correct. Accordingly, only line 1 is fetched speculatively with respect to the verification of line 0's branch prediction.

Returning to FIG. 11, a case in which the conditional branch prediction from branch predictor 18A disagrees with the branch prediction within the line predictor is shown. In this example, line 0 indicates a first taken path index (subscript t1) is the next index, which further indicates a second taken path index (subscript t2). Both taken path fetches are speculative. Similar to the example of FIG. 10, the branch offset is added to the fetch address and branch predictor 18A produces a branch prediction (arrows 146 and 148). However, in FIG. 11, the fetch PC generation unit 18D determines that the prediction from branch predictor 18A disagrees with the prediction from line 0 (i.e. branch predictor 18A predicts not taken and line 0 predicts taken—arrow 154). Fetch PC generation unit 18D returns a status of misprediction to line predictor 12.

Control circuit 74 records the next alternate index and next alternate fetch address from line 0 during clock cycle CLK1. In response to the misprediction status from fetch PC generation unit 18D, control circuit 74 provides the next alternate index from line 0 during clock cycle CLK4. The next alternate index is the not taken path in this example . . . subscript nt1. However, the same timing diagram applies if the branch instruction is originally predicted not taken and subsequently predicted taken by branch predictor 18A. Also during clock cycle CLK4, the speculative fetches of lines t1 and t2 are cancelled and the next alternate fetch address is provided as the next fetch address to I-cache 14.

During clock cycle CLK5, control circuit 74 updates the line predictor entry for line 0 to swap the next index and next alternate index fields, to swap the next fetch address and next alternate fetch address fields, and to change the branch prediction (arrow 156). For example, if a single bit of branch prediction is stored in line 0 and the prediction was taken (as in the example of FIG. 11), the prediction is updated to not taken. Since control circuit 74 is updating index table 72 during clock cycle CLK5, the next index from line nt1 (indicating line nt2) is not fetched from the index table until clock cycle CLK6. Control circuit 74 may capture the next index from line nt1 and provide that index through index mux 76 during clock cycle CLK6.

It is noted that control circuit 74 captures line information at various points during operation, and uses that information in a subsequent clock cycle. Control circuit 74 may employ a queue having enough entries to capture line predictor entries during successive clock cycles and retain those entries long enough to perform any potential corrective measures. For example, in the present embodiment, a queue of two entries may be used. Alternatively, a larger queue may be employed and may store line predictor entries which have not yet been verified as correct (e.g. decode units 24A–24D have not yet verified the instruction alignment information, etc.).

Turning next to FIG. 12, a timing diagram illustrating a misprediction for an indirect branch instruction terminating line 0 is shown. Line 0 is fetched from the line predictor in clock cycle CLK1, and the next index and next fetch address are based on a previous execution of the indirect branch instruction. Accordingly, line 1 is fetched, and subsequently line 2, during clock cycles CLK2 and CLK3, respectively. Similar to FIG. 11, the branch instruction address is generated (arrow 146). However, in this case, the indirect branch target cache 18B is accessed during clock cycles CLK2 and CLK3 (arrow 158). Fetch PC generation unit 18D compares the indirect target address provided by indirect branch target cache 18B to the next fetch address from line 0, and a mismatch is detected (arrow 160). Fetch PC generation unit 18D indicates, via that status lines, that a mispredicted indirect branch target has been detected.

During clock cycle CLK4, the speculative fetches of lines 1 and 2 are cancelled. In addition, control circuit 74 activates PC CAM 70 to cam the predicted indirect branch target address being provided by fetch PC generation unit 18D as the fetch address during clock cycle CLK4. The cam completes during clock cycles CLK4 and CLK5. A hit is detected, and the LP index from the hitting entry (entry i) is provided to index table 72 during clock cycle CLK6. During clock cycle CLK7, control circuit 74 updates the line 0 entry to set the next fetch address to the newly predicted indirect branch target address provided by indirect branch target cache 18B and the next index field to indicate line i (arrow 162).

FIG. 14 illustrates a case in which line 0 is terminated by a return instruction, but the next fetch address does not match the return address at the top of return stack 18C. Fetch PC generation unit 18D determines from the branch information for line 0 that the termination instruction is a return instruction, and therefore compares the next fetch address to the return address stack during clock cycle CLK2 (arrow 164). Fetch PC generation unit 18D returns a status of misprediction to line predictor 12, and provides the predicted return address from return address stack 18C as the fetch address (clock cycle CLK3). As with the indirect branch target address misprediction, control circuit 74 activates PC CAM 70 during clock cycle CLK3, and the cam completes with a hit during clock cycle CLK4 (with the LP index from the hitting entry indicating entry RAS in index table 72). Line RAS is fetched during clock cycle CLK4, and control circuit 74 updates the next fetch address field of line 0 to reflect the newly predicted return address and the next index field of line 0 to reflect line RAS (arrow 166).

Turning next to FIG. 15, an example of line 0 being terminated by a continuation over a page crossing is shown. During clock cycle CLK0, line 0 is fetched from the line predictor. Control circuit 74 detects the continuation indication in line 0, and indicates that the next fetch address is to be translated. The virtual next fetch address in this case is provided by fetch PC generation unit 18D to ITLB 60 for translation. The result of the translation is compared to the next fetch address provided by line predictor 12 to ensure that the correct physical address is provided. If the next fetch address is incorrect, line predictor 12 is updated and the corresponding linear address may be cammed to detect the next entry. FIG. 15 illustrates the case in which the next fetch address is correct (i.e. the physical mapping has not been changed). Accordingly, the next index from line 0 is fetched from index table 72 during clock cycle CLK2, and the instructions from the new page are read in clock cycle CLK3 (IC stage for line 1). Line 1 further indicates that line 2 is the next index to be fetched from the line predictor, and fetching continues via the indexes from cycle CLK3 forward in FIG. 15.

Additionally, line 0 is stalled in the decode stage until the instruction bytes for line 1 arrive in the decode stage. The instruction bytes may then be merged by the decode unit (clock cycle CLK5) and the corresponding line of instructions may continue to propagate through the pipeline (illustrated by line 0 and line 1 propagating to the M1 stage in clock cycle CLK6 and to the M2 stage in clock cycle CLK7). It is noted that, while the merge is performed in decode units 24A–24D in the present embodiment, other embodiments may effect the merge in other stages (e.g. the alignment stage).

It is noted that the terms misprediction and correct prediction have been used with respect to FIGS. 10–15 to refer to the prediction in the line predictor agreeing with the prediction from branch predictors 18A–18C. However, a "correct prediction" in this sense may still lead to a misprediction during execution of the corresponding branch instruction, and a "misprediction" in this sense may alter what would have been a correct prediction according to execution of the corresponding branch instruction.

Turning next to FIG. 16, a timing diagram illustrates initiation of decode by predictor miss decode unit 26 due to a fetch miss in PC CAM 70. During clock cycle CLK1, the cam of the fetch address completes and a miss is detected (arrow 168). In response to the miss, control circuit 74 assigns an entry in PC CAM 70 and index table 72 for the missing line predictor entry. The fetch address and corresponding instruction bytes flow through the line predictor, instruction cache, and alignment stages. Since there is no valid alignment information, alignment unit 16 provides the fetched instruction bytes to predictor miss decode unit 26 at the decode stage (illustrated as SDEC0) in FIG. 16.

FIG. 17 illustrates another case in which decode is initiated by predictor miss decode unit 26. In the case of FIG. 17, line 0 stores a null or invalid next index (arrow 170). In response to the invalid next index, control circuit 74 initiates a cam of PC CAM 70 of the fetch address provided by fetch PC generation unit 18D (clock cycle CLK2). As described above, fetch PC generation unit 18D continues to generate virtual fetch addresses corresponding to the next fetch addresses provided by line predictor 12 (using the branch information provided by line predictor 12). It is noted that one or more clock cycles may occur between clock cycles CLK1 and CLK2, depending upon the number of clock cycles which may occur before the corresponding virtual address is generated by fetch PC generation unit 18D.

The cam completes in clock cycle CLK3, and one of two actions are taken depending upon whether the cam is a hit (arrow 172) or a miss (arrow 174). If the cam is a hit, the LP index from the hitting entry is provided to index table 72 and the corresponding line predictor entry is read during clock cycle CLK4. During clock cycle CLK5, control circuit 74 updates line 0, setting the next index field to equal the LP index provided from the hitting entry.

On the other hand, if the cam is a miss, the fetch address and the corresponding instruction bytes flow through the line predictor, instruction cache, and alignment stages (clock cycles CLK4, CLK5, and CLK6), similar to the timing diagram of FIG. 16. Control circuit 74 assigns entries in PC CAM 70 and index table 72 according to the employed replacement scheme (e.g. FIFO), and updates line 0 with the assigned next index value (clock cycle CLK5). Subsequently, predictor miss decode unit 26 may update the assigned entries with information generated by decoding the corresponding instruction bytes. It is noted that, in the case that the cam is a miss, the update may be delayed from clock cycle CLK5 since the line predictor is idle while predictor miss decode unit 26 is decoding.

FIG. 18 illustrates a case in which a hit in both PC CAM 70 and index table 72 is detected, but the instruction alignment information (e.g. instruction pointers) are found not to correspond to the instruction bytes. This case may occur due to address aliasing, for example, in embodiments which compare a predetermined range of the fetch address in PC CAM 70 to the fetch addresses.

The instruction bytes and alignment information flow through the instruction cache and alignment stages. Alignment unit 16 uses the provided alignment information to align instructions to decode units 24A–24D. The decode units 24A–24D decode the provided instructions (Decode stage, clock cycle CLK4). Additionally, the decode units 24A–24D signal one of decode units 24A–24D (e.g. decode unit 24A) with an indication of whether or not that decode unit 24A–24D received a valid instruction. If one or more of the instructions is invalid (clock cycle CLK5), the instruction bytes are routed to predictor miss decode unit 26 (clock cycle CLK6). It is noted that predictor miss decode unit 26 may speculatively begin decoding at clock cycle CLK4, if desired.

FIGS. 16–18 illustrate various scenarios in which predictor miss decode unit 26 initiates a decode of instruction bytes in order to generate a line predictor entry for the instruction bytes. FIGS. 19–20 illustrate operation of predictor miss decode unit 26 in performing the decode, regardless of the manner in which the decode was initiated.

FIG. 19 illustrates generation of a line predictor entry for a line of instructions terminated by a non-branch instruction. During clock cycles CLK1, CLK2, and up to CLKM, predictor miss decode unit 26 decodes the instructions within the provided instruction bytes. The number of clock cycles may vary depending on the instruction bytes being decoded. In clock cycle CLKM, predictor miss decode unit 26 determines that a termination condition has been reached and that the termination condition is a nonbranch instruction (arrow 184). In response to terminating the line in a non-branch instruction, predictor miss decode unit 26 provides the sequential address to line predictor 12 and line predictor 12 cams the sequential address to the terminating instruction to determine if a line predictor entry corresponding to the next sequential instruction is stored therein (clock cycles CLKN and CLKN+1). In the example, a hit is detected and the sequential instructions are read from the instruction cache and the corresponding line predictor entry is read from line predictor 12 (clock cycle CLKN+2). Predictor miss decode unit 26 transmits the line predictor entry to line predictor 12, which updates the line predictor entry assigned to the line (e.g. line 0 ... clock cycle CLKN+3). The next index field of the updated entry is set to the index in which the sequential address hits. If the sequential address were to miss in line predictor 12, line 0 may still be updated at clock cycle CLKN+3. In this case, however, the next index field is set to indicate the entry allocated to the missing sequential address. Instruction bytes corresponding to the missing sequential address are provided to predictor miss decode unit 26, which generates another line predictor entry for the instruction bytes.

FIG. 20 illustrates generation of a line predictor entry for a line terminated by a branch instruction. Similar to the timing diagram of FIG. 19, predictor miss decode unit 26 decodes instructions within the instruction bytes for one or more clock cycles (e.g. CLK1, CLK2, and up to CLKM in the example of FIG. 20). Predictor miss decode unit 26 decodes the branch instruction, and thus determines that the line is terminated (arrow 186). If the line is terminated in a conditional branch instruction, the next fetch address is either the branch target address or the sequential address. A prediction is used to initialize the line predictor entry to select one of the two addresses. On the other hand, if the line is terminated by an indirect branch instruction, the target address is variable. A prediction from indirect branch target cache 18B is used to initialize the next fetch address (and index). Similarly, if the line is terminated by a return instruction, a return address prediction from return stack 18C is used to initialize the next fetch address (and index).

Predictor miss decode unit 26 may access the branch predictors 18A–18C to aid in initializing the next fetch address (and next index). For conditional branches, branch predictor 18A is accessed to provide a branch prediction. For indirect branches, branch predictor 18B is accessed to provide a predicted indirect branch target address. For return instructions, the top entry of return stack 18C is used as the prediction for the next fetch address. FIG. 20 illustrates the timing for accessing branch predictor 18A. The timing for accessing branch predictor 18B may be similar. Return stack 18C may be accessed without the address of the instruction, but otherwise may operate similarly.

The address of the branch instruction is provided to the branch predictor 18A (arrow 176) and the predictor accesses a corresponding prediction (arrow 178). The taken or not taken prediction is determined (arrow 180). In response to the taken/not taken prediction from branch predictor 18A, predictor miss decode unit 26 selects a predicted next fetch address (subscript PA). The predicted next fetch address is the branch target address if the branch instruction is predicted taken, or the sequential address if the branch instruction is predicted not taken. Predicior miss decode unit 26 provides the predicted address to line predictor 12, which cams the predicted address in PC CAM 70 (clock cycles CLKN+2 and CLKN+3) and, similar to the timing diagram of FIG. 19, records the corresponding LP index from the hitting entry as the next index of the newly created line predictor entry. If the predicted address is a miss, the index of the assigned entry is stored. The next fetch address of the newly created line predictor entry is set to the predicted address, and the next alternate fetch address is set to whichever of the sequential address and branch target address is not predicted. The next alternate index is set to null (or invalid). Line 0 (the entry assigned to the line predictor entry being generated) is subsequently updated (clock cycle CLK N+5).

A similar timing diagram may apply to the indirect branch case, except that instead of accessing branch predictor 18A to get a prediction for the branch instruction, indirect branch target cache 18B is accessed to get the predicted address. For return instructions, a similar timing diagram may apply except that the top of return stack 18C is used as the predicted address.

FIG. 20 illustrates the training of the line predictor entry for a predicted fetch address. However, conditional branches may select the alternate address if the condition upon which the conditional branch depends results in a different outcome for the branch than was predicted. However, the next alternate index is null (or invalid), and hence if the branch prediction for the conditional branch changes, then the next index is not known.

FIG. 21 illustrates the training of a conditional branch instruction which is initialized as taken. Initialization to not taken may be similar, except that the sequential address and next index are selected during clock cycles CLKN–CLKN+1 and the index of the branch target address is found in clock cycles CLKM–CLKM+7. Clock cycles CLK1–CLK3 and CLKN–CLKN+5 are similar to the above description of FIG. 20 (with the predicted address being the branch target address, subscript Tgt, in response to the taken prediction from branch predictor 18A).

Subsequently, during clock cycle CLKM, line 0 (terminated with the conditional branch instruction) is fetched (clock cycle CLKM). As illustrated by arrow 182, the next index of line 0 continues to select the line corresponding to the branch target address of the conditional branch instruction. In parallel, as illustrated in FIG. 11 above, the address of the conditional branch instruction is generated and branch predictor 18A is accessed. In this example, the prediction has now changed to not taken (due to executions of the conditional branch instruction). Furthermore, since the next alternate index is null, line predictor 12 cams the next alternate fetch address against PC CAM 70 (clock cycles CLKM+4 and CLKM+5). In the example, the sequential address is a hit. Control circuit 74 swaps the next fetch address and next alternate fetch address fields of line 0, puts the former next index field (identifying the line predictor entry of the branch target address) in the next alternate index field, and sets the next index field to the index corresponding to the sequential address. Control circuit 74 updates line 0 in index table 72 with the updated next entry information in clock cycle CLKM+7. Accordingly, both the sequential and target paths have been trained into line 0. Subsequently, the next and next alternate addresses (and indexes) may be swapped according to branch predictor 18A (e.g. FIG. 11), but predictor miss decode unit 26 may not be activated.

Predictor Miss Decode Unit Block Diagram

Figure 22:
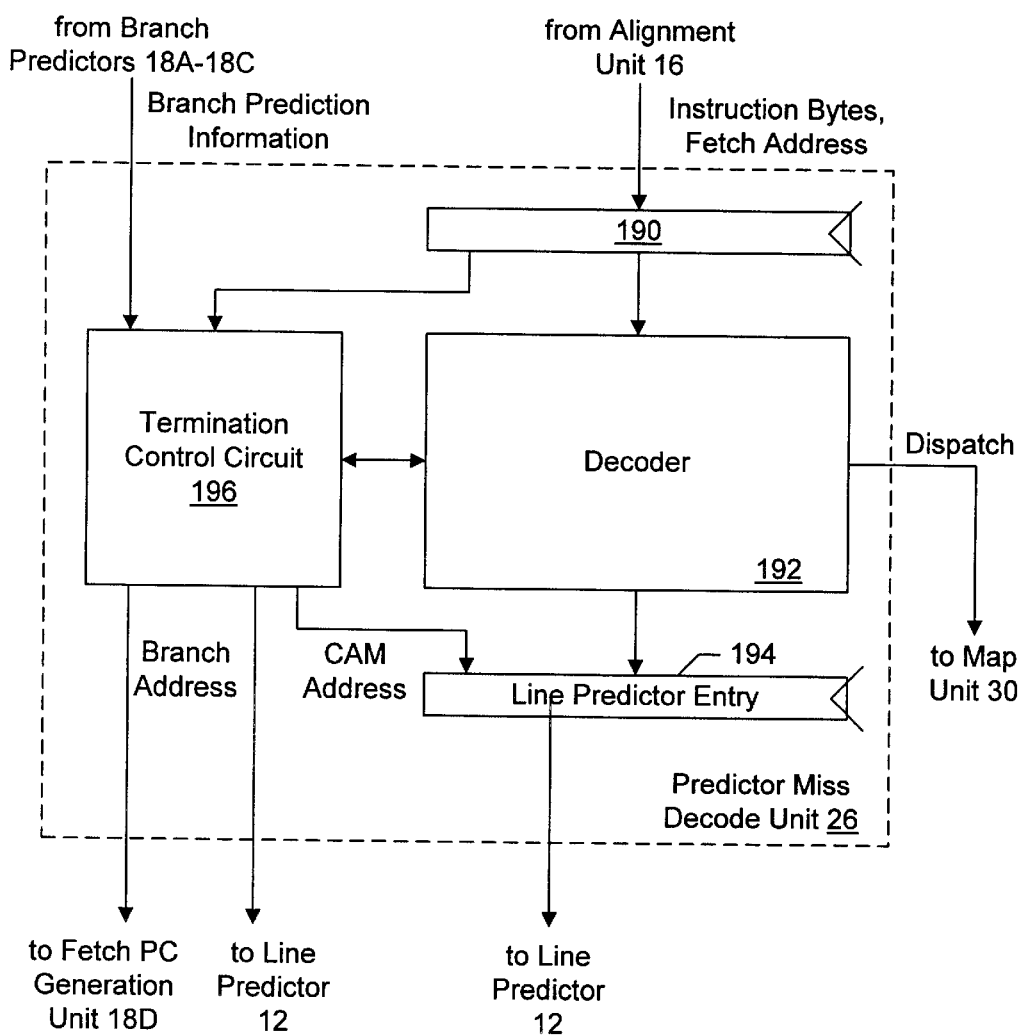
FIG. 22 is a block diagram illustrating one embodiment of a predictor miss decode unit shown in FIGS. 1 and 3.

Turning now to FIG. 22, a block diagram of one embodiment of predictor miss decode unit 26 is shown. Other embodiments are possible and contemplated. In the embodiment of FIG. 22, predictor miss decode unit 26 includes a register 190, a decoder 192, a line predictor entry register 194, and a termination control circuit 196. Register 190 is coupled to receive instruction bytes and a corresponding fetch address from alignment unit 16, and is coupled to decoder 192 and termination control circuit 196. Decoder 192 is coupled to line predictor entry register 194, to termination control circuit 192, and to dispatch instructions to map unit 30. Line predictor entry register 194 is coupled to line predictor 12. Termination control circuit 196 is coupled to receive branch prediction information from branch predictors 18A–18C and is coupled to provide a branch address to fetch PC generation unit 18D and a CAM address to line predictor 12. Together, the branch prediction address, the CAM address, and the line entry (as well as control signals for each, not shown) may comprise the line predictor update bus shown in FIG. 3.

Generally, decoder 192 decodes the instruction bytes provided from alignment unit 16 in response to one of the cases shown in FIGS. 16–18 above. Decoder 192 may decode several bytes in parallel (e.g. four bytes per clock cycle, in one embodiment) to detect instructions and generate a line predictor entry. The first byte of the instruction bytes provided to predictor miss decode unit 26 is the first byte of instruction (since line predictor entries begin and terminate as full instructions), and thus decoder 192 locates the end of the first instruction as well as determining the instruction pointer(s) corresponding to the first instruction and detecting if the first instruction is a termination condition (e.g. branch, microcode, etc.) Similarly, the second instruction is identified and processed, etc. Decoder 192 may, for example, employ a three stage pipeline for decoding each group of four instruction bytes. Upon exiting the pipeline, the group of four bytes is decoded and corresponding instruction information has been determined.

As instructions are identified, pointers to those instructions are stored in the instruction pointer fields 102–108 of the entry. Decoder 192 accumulates the line predictor entry in line predictor entry register 194. Additionally, decoder 192 may dispatch instructions to map unit 30 as they are identified and decoded.

In response to detecting a termination condition for the line, decoder 192 signals termination control circuit 196 of the type of termination. Furthermore, decoder 192 sets the last instruction type field 120 to indicate the terminating instruction type. If the instruction is an MROM instruction, decoder 192 generates an entry point for the instruction and updated MROM entry point field 132. Branch displacement field 124 and continuation field 126 are also set appropriately.

In response to the termination condition, termination control circuit 196 generates the address of the branch instruction and accesses the branch predictors (if applicable). In response to the branch prediction information received in response to the branch address, termination control circuit 196 provides the CAM address as one of the sequential address or the branch target address. For lines terminated in a non-branch instruction, termination control circuit 196 provides the sequential address as the CAM address. Line predictor 12 searches for the CAM address to generate the next index field. Based on the branch predictor access (if applicable, or the sequential address otherwise), termination control circuit 196 initializes next fetch address field 112 and next alternate fetch address field 114 in line predictor entry register 194 (as well as branch prediction field 122). The next index may be provided by control circuit 74 as the entry is updated into line predictor 12, or may be provided to termination control circuit 196 for storage in line predictor entry register 194.

Computer Systems

Figure 23:
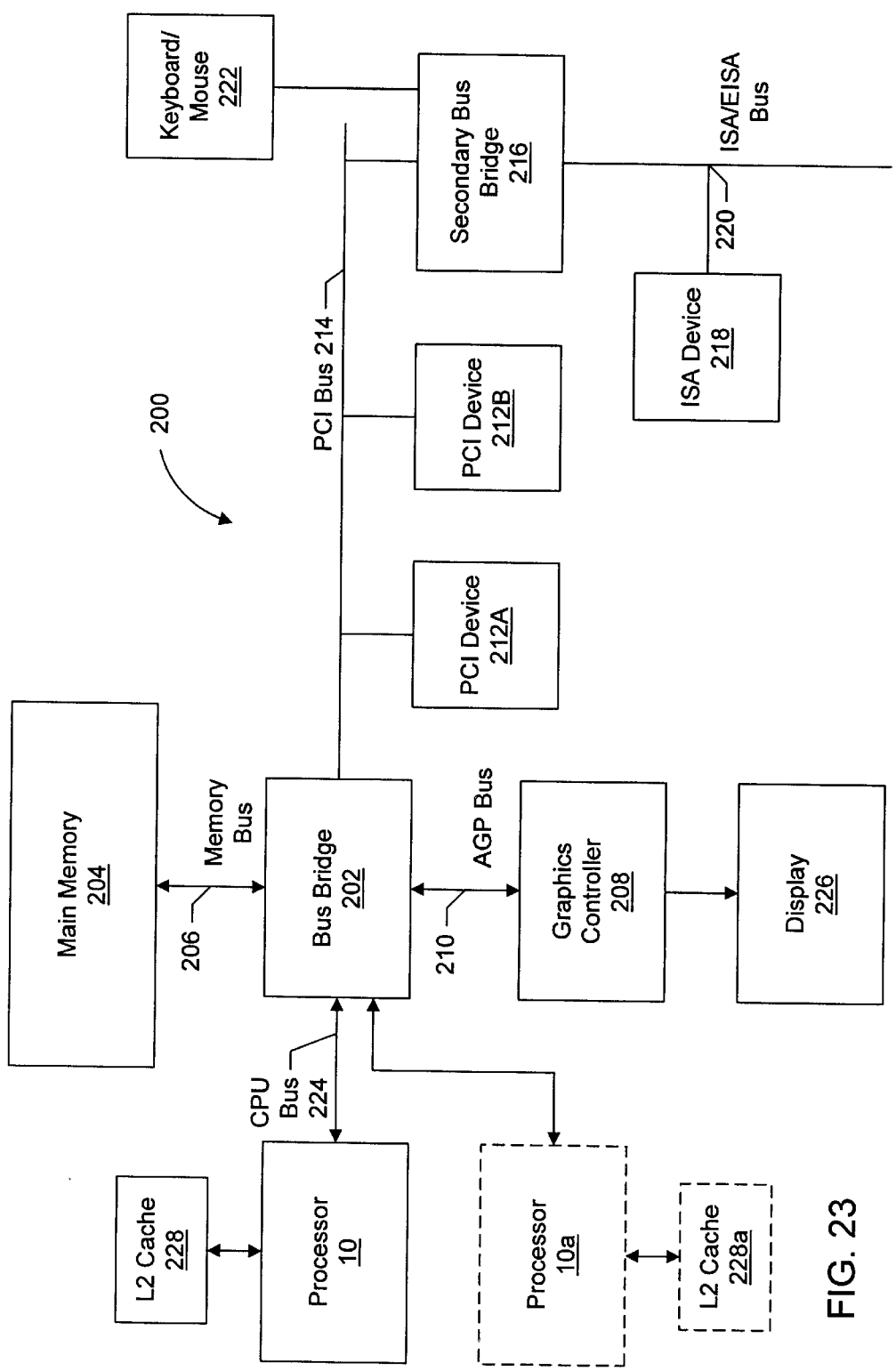
FIG. 23 is a block diagram of a first exemplary computer system including the processor shown in FIG. 1.

Turning now to FIG. 23, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional fuctionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 23) or may share CPU bus 224 with processor 10. Furthermore, processor 10a may be coupled to an optional L2 cache 228a similar to L2 cache 228.

Figure 24:
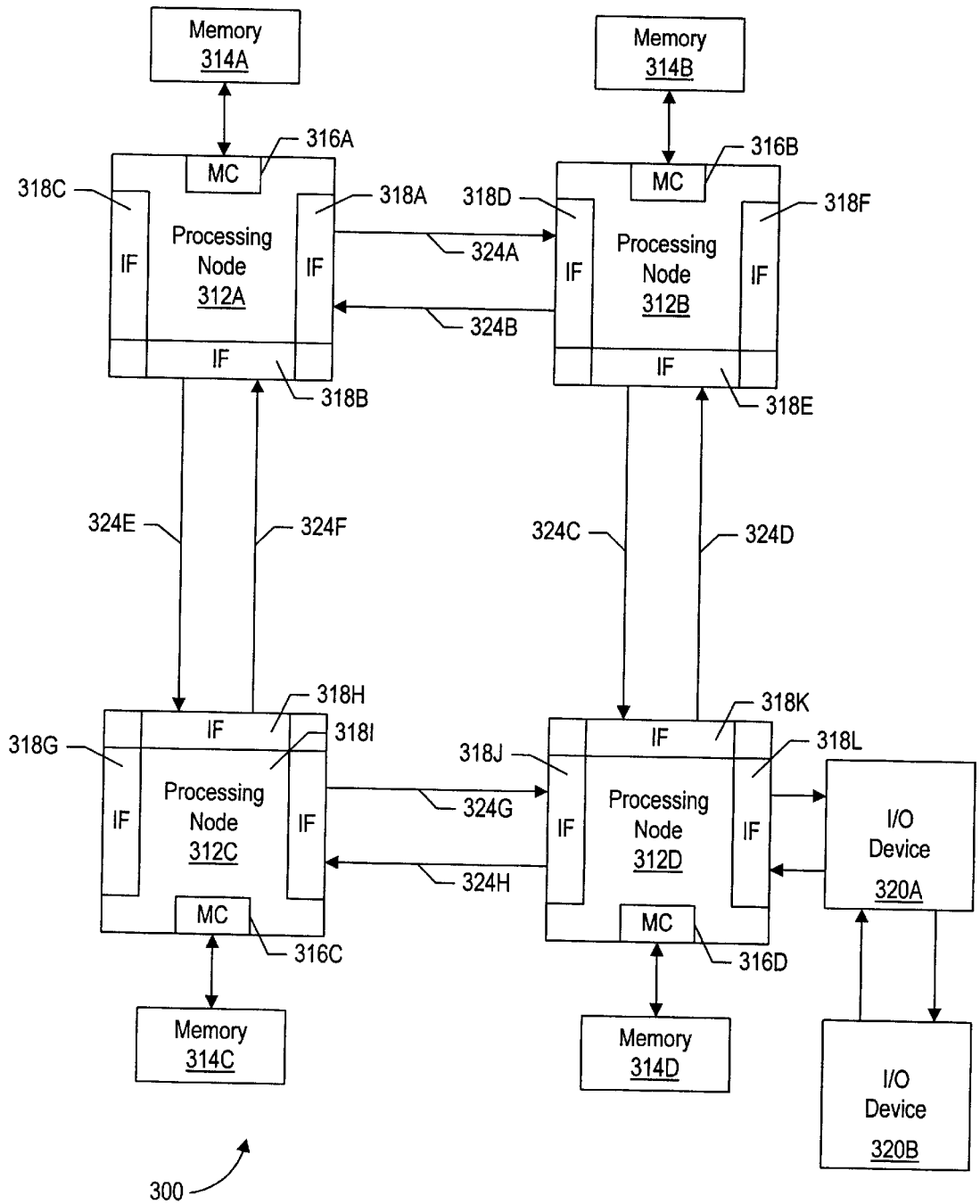
FIG. 24 is a block diagram of a second exemplary computer system including the processor shown in FIG. 1.

Turning now to FIG. 24, another embodiment of a computer system 300 is shown. Other embodiments are possible and contemplated. In the embodiment of FIG. 24, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 24. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 24. Any suitable routing algorithm may be used. Other embodiments of computer system 300 may include more or fewer processing nodes then the embodiment shown in FIG. 24.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A processor comprising:
   a fetch address generation unit configured to generate a fetch address;
   a line predictor coupled to said fetch address generation unit, said line predictor including a first memory comprising a plurality of entries, each entry storing a plurality of instruction pointers, wherein said line predictor is configured to detect a miss of said fetch address in said line predictor; and a decode unit coupled to receive a plurality of instruction bytes fetched in response to said fetch address and further coupled to said line predictor, said decode unit configured to decode said plurality of instruction bytes in response to said miss to generate said plurality of instruction pointers for a first entry in said first memory, said first entry corresponding to said fetch address, and wherein said decode unit is configured to terminate decode and provide said plurality of instruction pointers to said line predictor in response to detecting a termination condition.

2. The processor as recited in claim 1 wherein said termination condition comprises decoding a microcode instruction.

3. The processor as recited in claim 1 wherein said termination condition comprises decoding a branch instruction.

4. The processor as recited in claim 1 wherein said termination condition comprises decoding a predetermined maximum number of instructions.

5. The processor as recited in claim 4 wherein a particular instruction within said plurality of instruction bytes is counted as two instructions if said particular instruction decodes into more than two instruction operations and is not a microcode instruction.

6. The processor as recited in claim 1 wherein said termination condition comprises decoding a predetermined maximum number of instruction operations.

7. The processor as recited in claim 1 wherein said termination condition comprises decoding all of said plurality of instruction bytes.

8. The processor as recited in claim 1 wherein said termination condition comprises detecting a page crossing within said plurality of instruction bytes.

9. The processor as recited in claim 1 wherein said termination condition comprises decoding instructions having a total number of destination registers equal to a predefined maximum number of rename registers concurrently assignable.

10. A computer system comprising:

a processor comprising:

a fetch address generation unit configured to generate a fetch address;

a line predictor coupled to said fetch address generation unit, said line predictor including a first memory comprising a plurality of entries, each entry storing a plurality of instruction pointers, wherein said line predictor is configured to detect a miss of said fetch address in said line predictor; and a decode unit coupled to receive a plurality of instruction bytes fetched in response to said fetch address and further coupled to said line predictor, said decode unit configured to decode said plurality of instruction bytes in response to said miss to generate said plurality of instruction pointers for a first entry in said first memory, said first entry corresponding to said fetch address, and wherein said decode unit is configured to terminate decode and provide said plurality of instruction pointers to said line predictor in response to detecting a termination condition; and an input/output (I/O) device configured to communicate between said computer system and another computer system to which said I/O device is couplable.

11. The computer system as recited in claim 10 wherein said I/O device comprises a modem.

12. A method comprising:

generating a fetch address;

detecting a miss of said fetch address in a line predictor, said line predictor including a first memory comprising a plurality of entries, each entry storing a plurality of instruction pointers; and responsive to said miss, decoding a plurality of instruction bytes fetched in response to said fetch address to generate said plurality of instruction pointers for a first entry in said first memory, said first entry corresponding to said fetch address;

detecting a termination condition during said decoding; and terminating said decoding and providing said plurality of instruction pointers to said line predictor in response to detecting a termination condition.

13. The method as recited in claim 12 wherein said detecting a termination condition comprises decoding a microcode instruction.

14. The method as recited in claim 12 wherein said detecting a termination condition comprises decoding a branch instruction.

15. The method as recited in claim 12 wherein said detecting a termination condition comprises decoding a predetermined maximum number of instructions.

16. The method as recited in claim 15 wherein said decoding a predetermined maximum number of instructions comprises counting a particular instruction within said plurality of instruction bytes as two instructions if said particular instruction decodes into more than two instruction operations and is not a microcode instruction.

17. The method as recited in claim 12 wherein said detecting a termination condition comprises decoding a predetermined maximum number of instruction operations.

18. The method as recited in claim 12 wherein said detecting a termination condition comprises decoding all of said plurality of instruction bytes.

19. The method as recited in claim 12 wherein said detecting a termination condition comprises detecting a page crossing within said plurality of instruction bytes.

20. The method as recited in claim 12 wherein said detecting a termination condition comprises decoding instructions having a total number of destination registers equal to a predefined maximum number of rename registers concurrently assignable.

21. A processor comprising:

a plurality of pipeline stages;

a line predictor coupled to receive a fetch address, the line predictor comprising a memory including a plurality of entries, each of the plurality of entries configured to store data indicative of a plurality of instruction operations, wherein the line predictor is configured to output data from a first entry of the plurality of entries in response to the fetch address hitting in the memory, and wherein the line predictor is configured to detect a miss in the memory;

a decode unit coupled to receive a plurality of instruction bytes fetched in response to the fetch address and coupled to the line predictor, wherein the decode unit is configured to decode the plurality of instruction bytes in response to a miss in the memory of the line predictor, wherein the decode unit is configured to generate the data for a second entry of the plurality of entries in response to decoding the plurality of instruction bytes, and wherein the decode unit is configured to terminate decode and provide the data for storage in the second entry in response to detecting at least one of a plurality of termination conditions, wherein the plurality of termination conditions ensure that a first plurality of instruction operations indicated by the data in the second entry passes through the plurality of pipeline stages as a unit.

22. The processor as recited in claim 21 wherein the plurality of pipeline stages terminates in a first pipeline stage in which the plurality of instruction operations is written to a scheduler.

23. The processor as recited in claim 21 wherein the plurality of termination conditions comprise decoding a microcode instruction.

24. The processor as recited in claim 21 wherein the plurality of termination conditions comprise decoding a branch instruction.

25. The processor as recited in claim 21 wherein the plurality of termination conditions comprise decoding a predetermined maximum number of instructions.

26. The processor as recited in claim 25 wherein a particular instruction within the plurality of instruction bytes is counted as two instructions if the particular instruction decodes into more than two instruction operations and is not a microcode instruction.

27. The processor as recited in claim 21 wherein the plurality of termination conditions comprise decoding a predetermined maximum number of instruction operations.

28. The processor as recited in claim 21 wherein the plurality of termination conditions comprise decoding all of the plurality of instruction bytes.

29. The processor as recited in claim 21 wherein the plurality of termination conditions comprise detecting a page crossing within the plurality of instruction bytes.

30. The processor as recited in claim 21 wherein the plurality of termination conditions comprise decoding instructions having a total number of destination registers equal to a predefined maximum number of rename registers concurrently assignable.

* * * * *